United States Patent [19]

Yamaoka et al.

[11] Patent Number: 5,510,985
[45] Date of Patent: Apr. 23, 1996

[54] SYSTEM FOR CONTROLLING DAMPING FORCE CHARACTERISTIC OF SHOCK ABSORBER OF VEHICLE

[75] Inventors: Fumiyuki Yamaoka; Toru Takahashi; Tetsuya Okamura; Michiya Nakamura, all of Atsugi, Japan

[73] Assignee: Unisia Jecs Corporation, Japan

[21] Appl. No.: 123,470

[22] Filed: Sep. 20, 1993

[30] Foreign Application Priority Data

Sep. 29, 1992 [JP] Japan .................................. 4-259739
Oct. 5, 1992 [JP] Japan .................................. 4-266148
Oct. 20, 1992 [JP] Japan .................................. 4-281410

[51] Int. Cl.$^6$ ............................................. B60G 17/06
[52] U.S. Cl. ................. 364/424.05; 280/707; 280/840
[58] Field of Search .................. 364/424.05; 280/840, 280/6.11, 6.12, 707

[56] References Cited

U.S. PATENT DOCUMENTS

| | | | |
|---|---|---|---|
| 4,809,179 | 2/1989 | Klinger et al. | 364/424.05 |
| 4,924,393 | 5/1990 | Kurosawa | 364/424.05 |
| 5,062,657 | 11/1991 | Majeed | 280/707 |
| 5,062,658 | 11/1991 | Majeed | 280/707 |
| 5,097,419 | 3/1992 | Lizell | 364/424.05 |
| 5,123,671 | 6/1992 | Driessen et al. | 280/707 |
| 5,193,844 | 3/1993 | Butsuen et al. | 280/707 |
| 5,203,584 | 4/1993 | Butsuen et al. | 280/707 |
| 5,217,246 | 6/1993 | Williams et al. | 280/707 |
| 5,289,390 | 2/1994 | Kimura | 364/424.05 |
| 5,365,432 | 11/1994 | Kakizaki et al. | 364/424.05 |

FOREIGN PATENT DOCUMENTS

| | | |
|---|---|---|
| 0255720 | 2/1988 | European Pat. Off. . |
| 4139690A1 | 6/1992 | Germany . |
| 61-163011 | 7/1986 | Japan . |
| 2234947 | 2/1991 | United Kingdom . |
| 2241208 | 8/1991 | United Kingdom . |
| 2260106 | 4/1993 | United Kingdom . |

*Primary Examiner*—Collin W. Park
*Attorney, Agent, or Firm*—Ronald P. Kananen

[57] ABSTRACT

A system for controlling damping force characteristics for respective shock absorbers of a vehicle in which each shock absorber is installed between sprung mass and unsprung mass at each tire wheel position, a front tire wheel side sprung mass vertical velocity and a front tire wheel side relative velocity between the sprung mass and unsprung mass are determined, the damping force characteristics of the shock absorbers located at the front tire wheels side are basically controlled on the basis of the control signal determined on the basis of the front tire wheel side sprung mass vertical velocity, and the damping force characteristics of the shock absorbers located at the rear tire wheels side are, on the other hand, controlled on the basis of the control signal determined on the basis of a front tire wheel side road surface input velocity determined on the basis of the front tire wheel side sprung mass vertical velocity and the front tire wheel side relative velocity determined from a front tire wheel side relative displacement and a rear tire wheel side vertical velocity determined from the rear tire wheel side relative velocity.

25 Claims, 21 Drawing Sheets

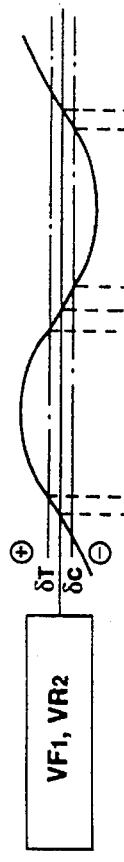
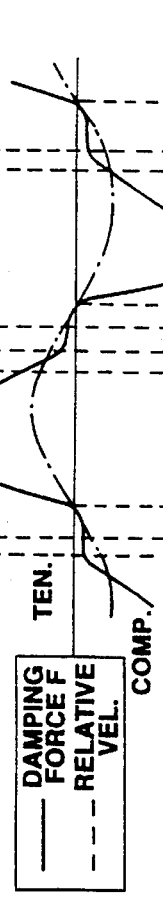
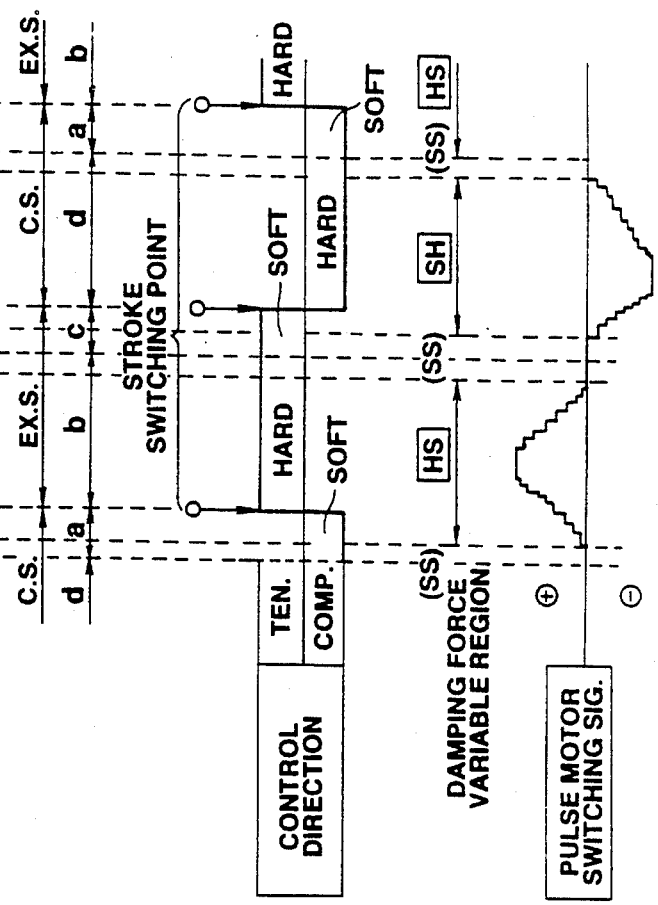
FIG.15(A) FIG.15(B) FIG.15(C) FIG.15(D)

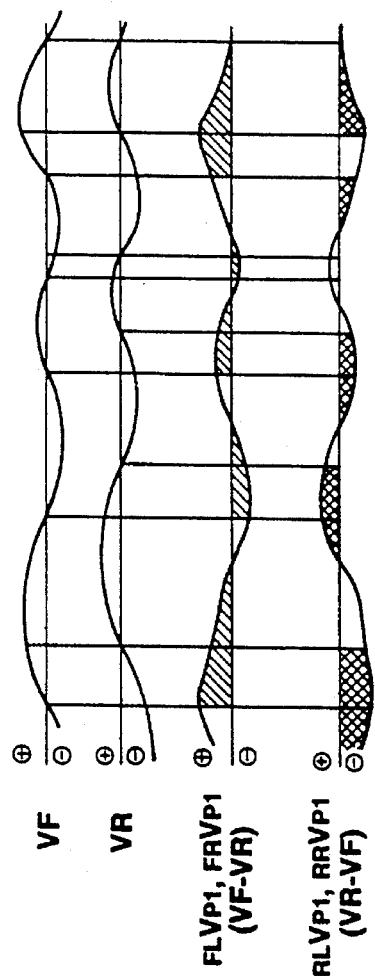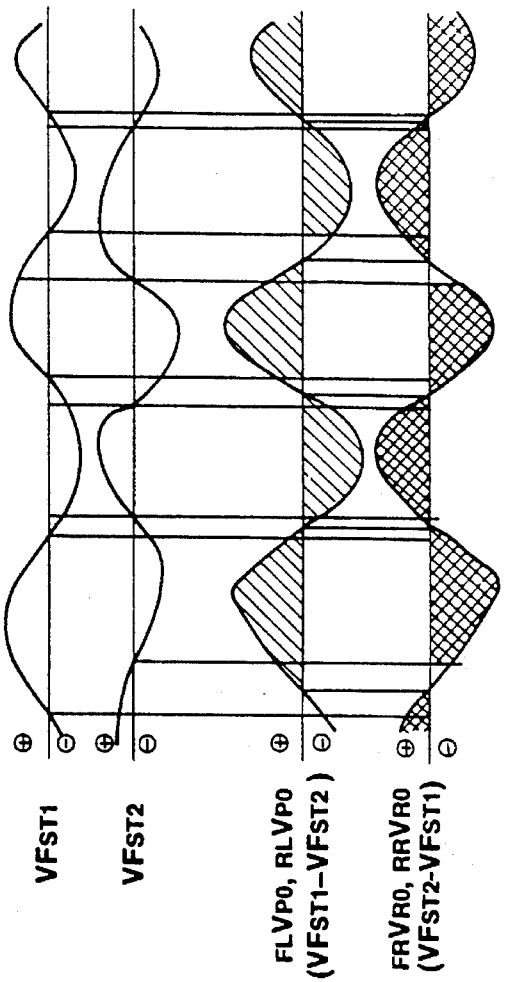

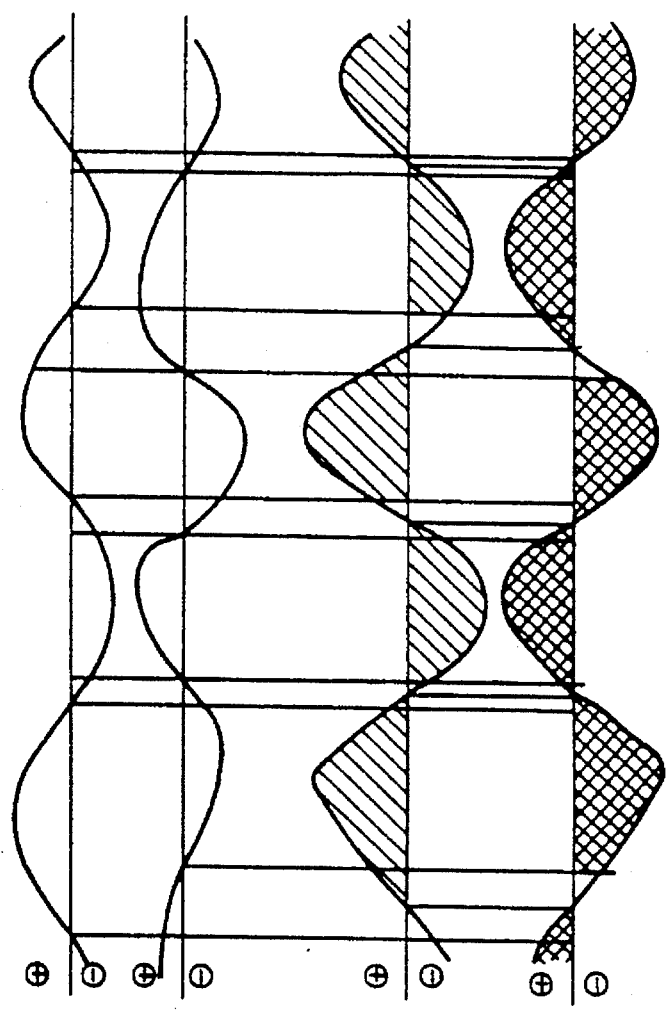
FIG.28(A) VFST1
FIG.28(B) VFST2
FIG.28(C) FLVP0, RLVP0 (VFST1−VFST2)
FIG.28(D) FRVR0, RRVR0 (VFST2−VFST1)

SYSTEM FOR CONTROLLING DAMPING FORCE CHARACTERISTIC OF SHOCK ABSORBER OF VEHICLE

BACKGROUND OF THE INVENTION

1. Field of the Invention

The present invention relates generally to a system for controlling damping force characteristics of respective shock absorbers of a vehicle, each shock absorber (also called a damper, but hereinafter referred to as the shock absorber) being interposed between an unsprung mass and sprung mass of the vehicle so as to provide an optimum damping force therefrom. The shock absorber is provided with changing means for changing the damping coefficient thereof at multiple stages in response to a control signal.

2. Description of the Background Art

A Japanese Patent Application First Publication No. Showa 61-163011 exemplifies a previously proposed damping characteristic controlling system for a vehicle.

In the disclosed Japanese Patent Application First Publication, a sprung mass vertical velocity and a relative velocity between sprung mass (vehicle body) and unsprung mass (tire wheel) are determined. When both velocities have mutually the same sign, the characteristics of the damping forces for any one or more shock absorbers are set to provide hard characteristics. When both velocities have the different signs (+ or −), the characteristics of the damping forces for the shock absorbers are set to provide soft characteristics. This setting operations are based on the damping force characteristic control called "Sky Hook" theory and carried out independently of four tire wheels.

SUMMARY OF THE INVENTION

It is, therefore, a principal object of the present invention to provide an improved system for controlling damping characteristics for respective shock absorbers of a vehicle which can achieve a reduction of manufacturing cost of the system by reducing numbers of vehicle behavior detecting means as low as possible, which can achieve improvement in controllability for the shock absorbers located at rear tire wheels, which can achieve improved durability of actuators such as pulse motors, which can achieve higher control responsive characteristics for the shock absorbers, which can achieve an improved consumed power saving, and which can provide a sufficient vibration suppression characteristic for each shock absorber against an inertia moment of the vehicle so as to improve a vehicular steering stability.

The above-described object can be achieved by providing a system for controlling damping forces for respective shock absorbers of a vehicle, comprising: a) plurality of shock absorbers, each shock absorber being interposed between a sprung mass and unsprung mass of the vehicle and located adjacent to any one of front left tire wheel, front right tire wheel, rear left tire wheel, and rear right tire wheel of the vehicle; b) damping force characteristic changing means for changing the damping force characteristic of each shock absorber at either or both of stroke directions with respect to a piston of each shock absorber in response to an input control signal; c) front tire wheel side sprung mass vertical velocity determining means for determining a front tire wheel side sprung mass vertical velocity; d) front tire wheel side relative velocity determining means for determining a relative velocity between the sprung so mass and a unsprung mass of the vehicle at the front tire wheels side; e) rear tire wheel side sprung mass relative velocity determining means for determining a relative velocity between the sprung mass and unsprung mass at the rear tire wheels side; and f) damping force characteristic controlling means for controlling the damping force characteristics of the shock absorbers located at the front tire wheels side on the basis of the control signal determined on the basis of the front tire wheel side sprung mass vertical velocity via damping force characteristic changing means and for controlling the damping force characteristics of the shock absorbers located at the rear tire wheels side on the basis of the control signal via the damping force characteristic changing means, the control signal at the rear tire wheels side being determined on the basis of front tire wheel side a road surface input velocity derived from the front tire wheel side sprung mass vertical velocity and from the front tire wheel side relative velocity between the sprung mass and on the basis of a sprung mass vertical velocity at the rear tire wheels side determined from the rear tire wheel side relative velocity between the sprung mass and unsprung mass.

BRIEF DESCRIPTION OF THE DRAWINGS

FIGS. 15(A), 15(B), 15(C), 15(D) are integrally a timing chart of each signal derived in the first preferred embodiment shown in FIGS. 1 and 2.

FIGS. 23(A) through 23(D) are integrally a timing chart of $v_F$, $v_R$, $(v_F-v_R)$, and $(v_R-v_F)$.

FIGS. 25(A) through 25(D) are integrally a timing chart of each signal of $v_{FST1}$, $v_{FST2}$, $(v_{FST1}-v_{FST2})$, and $(v_{FST2}-v_{FST1})$.

FIGS. 28(A) through 28(D) are integrally a timing chart of each signal of $v_{FST1}$, $v_{FST2}$, $(v_{FST1}-v_{ST2})$, and $(v_{FST2}-v_{FST1})$ in a case of an eighth preferred embodiment of the damping force characteristic controlling system.

DESCRIPTION OF THE PREFERRED EMBODIMENTS

Reference will, hereinafter, be made to the drawings in order to facilitate a better understanding of the present invention.

(First Embodiment)

Figure 1:
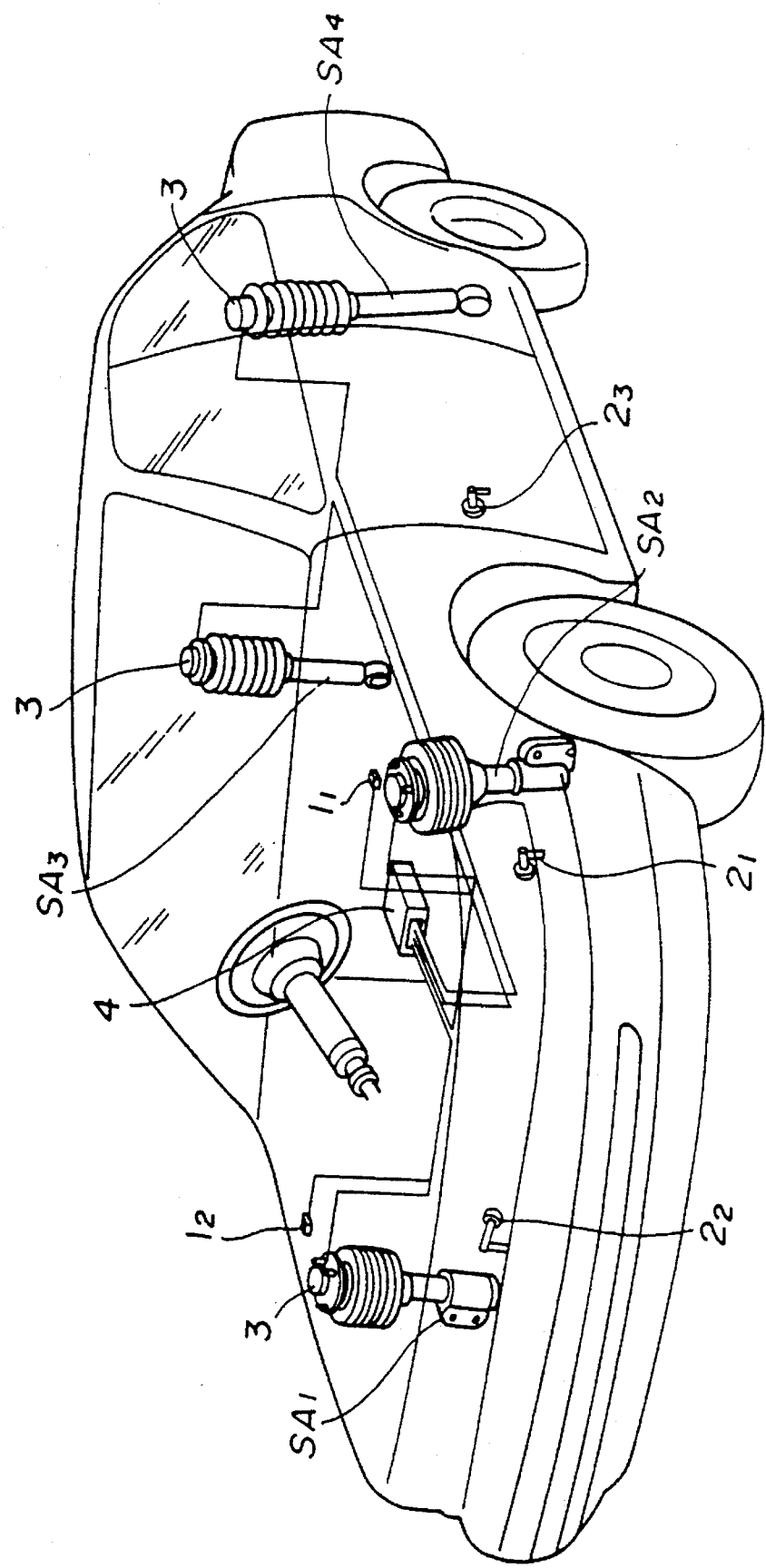
FIG. 1 is a schematic perspective view of a system for controlling damping force characteristics for respective shock absorbers of a vehicle in a first preferred embodiment according to the present invention.

FIG. 1 shows a structure of a system for controlling damping forces for respective shock absorbers in a first preferred embodiment according to the present invention.

Four shock absorbers (suspension units) $SA_1$, $SA_2$, $SA_3$, and $SA_4$ are interposed between respective parts of a vehicle body and respective tire wheels. It is noted SA denotes simply a representative shock absorber commonly used when each shock absorber is explained.

Two sprung mass vertical acceleration sensors $1_1$ and $1_2$ (so called, vertical G sensors) and two vehicular height sensors $2_1$ and $2_2$ are installed, on parts of a vehicle body positioned in the proximities to mounting positions of front tire wheel, left and right shock absorbers $SA_1$ and $SA_2$, so as to detect vertical (longitudinal) accelerations at the front tire wheels and so as to detect relative displacements between the sprung mass and unsprung mass at the front tire wheels, respectively.

Figure 16:
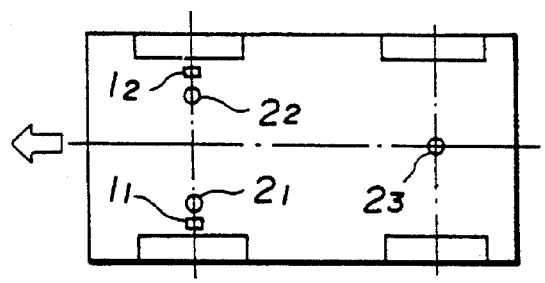
FIG. 16 is a schematic positional view of vertical G sensors and vehicular height sensors shown in FIGS. 1 and 2 in the case of the first preferred embodiment.

In addition, another vehicular height sensor $2_3$ is installed on an approximately center position between the rear left and right shock absorbers $SA_2$ and $SA_3$ so as to detect a relative displacement between the sprung mass and unsprung mass at the rear tire wheels. Such arrangements of the sensors are appreciated from FIG. 16.

A control unit 4 is installed on a part of the vehicle body which is placed in a proximity to a driver's seat and which receives output signals of each G sensor 1 ($1_1$ and $1_2$) and of vehicular height sensors 2 ($2_1$, $2_2$, and $2_3$) and of vehicle speed sensor 5 and produces control signals to stepping motors (also called, pulse motors) 3 connected to respective shock absorbers SA.

Figure 2:
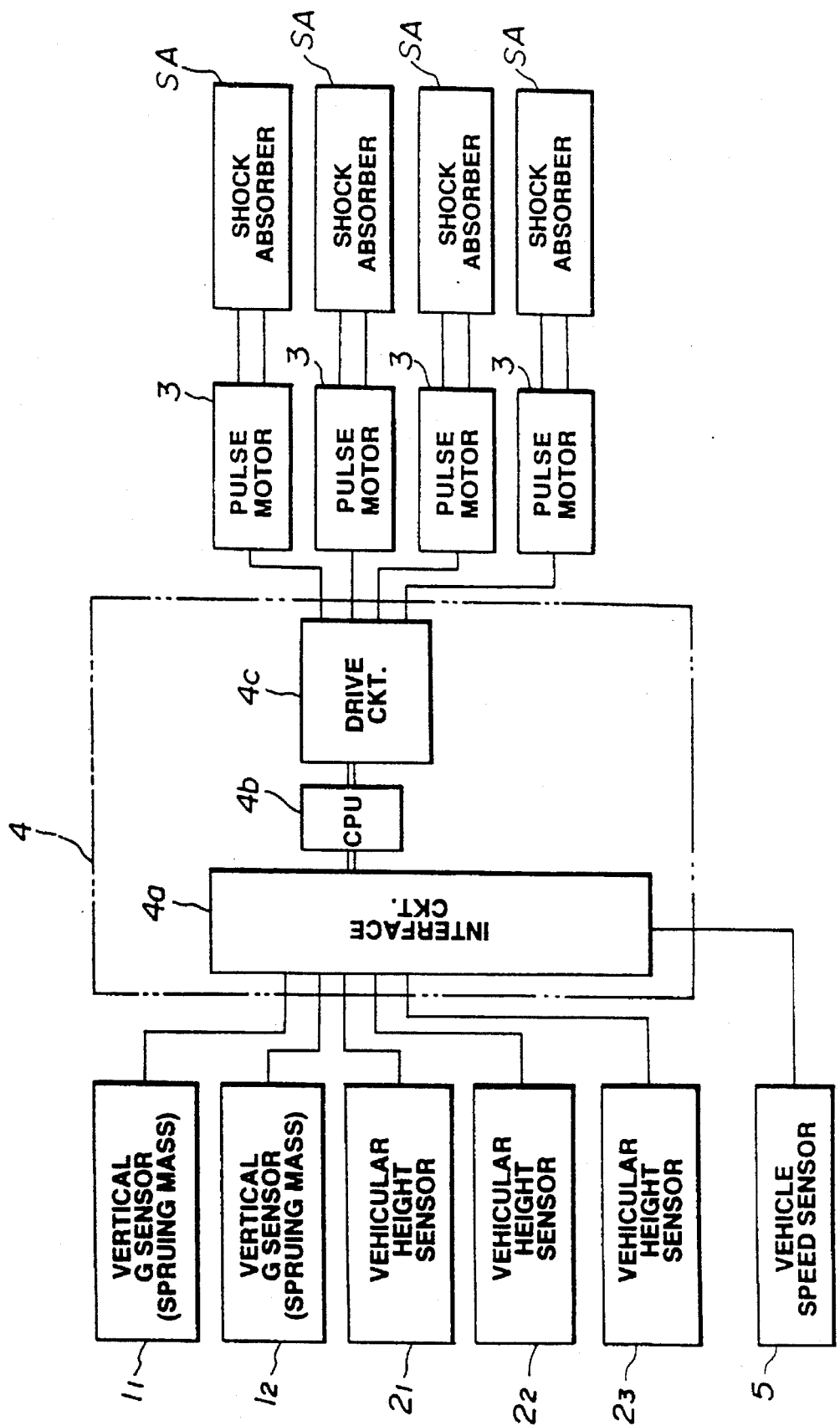
FIG. 2 is a schematic circuit block diagram of the damping force characteristic controlling system in the first preferred embodiment shown in FIG. 1.

FIG. 2 shows a circuit block diagram of the damping force characteristic controlling system shown in FIG. 1 in the first embodiment.

The control unit 4 includes, as shown in FIG. 2, an interface circuit 4a, CPU 4b, a drive circuit 4c. The interface circuit 4a receives signals derived from the respective G sensors 1 ($1_1$ and $1_2$), vehicular height sensors 2 ($2_1$, $2_2$, $2_3$), and vehicle speed sensor 3.

Figure 13:
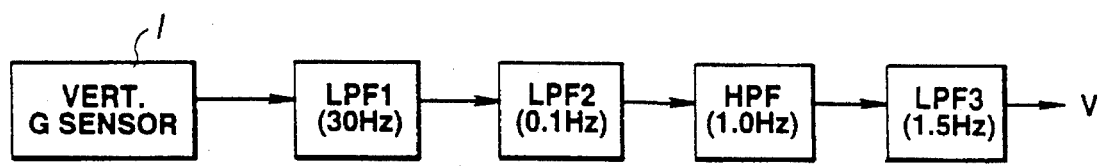
FIG. 13 is a schematic circuit block diagram of one vertical G sensor and its associated LPF and HPF circuits in the case of the first preferred embodiment shown in FIGS. 1 and 2.

It is noted that, as shown in FIG. 13, the interface circuit 4a includes low and high pass filters (LPF1, LPF2, HPF, and LPF3). The LPF1 serves to eliminate noises having high frequencies over 30 Hz from the output signal from each vertical G sensor 1. The LPF2 serves to integrate the signal passed from the LPF1 which indicates the vertical acceleration to output a signal indicating a corresponding vertical velocity of the sprung mass. The HPF serves to eliminate a lower signal component and have a cut-off frequency of 1.0 Hz. The LPF3 serves to eliminate noises having a cut-off frequency of 1.5 Hz. Both filters of HPF and LPF3 serves as a band pass filter to pass the signal indicating the sprung mass vertical speed including a sprung mass resonance frequency.

Figure 3:
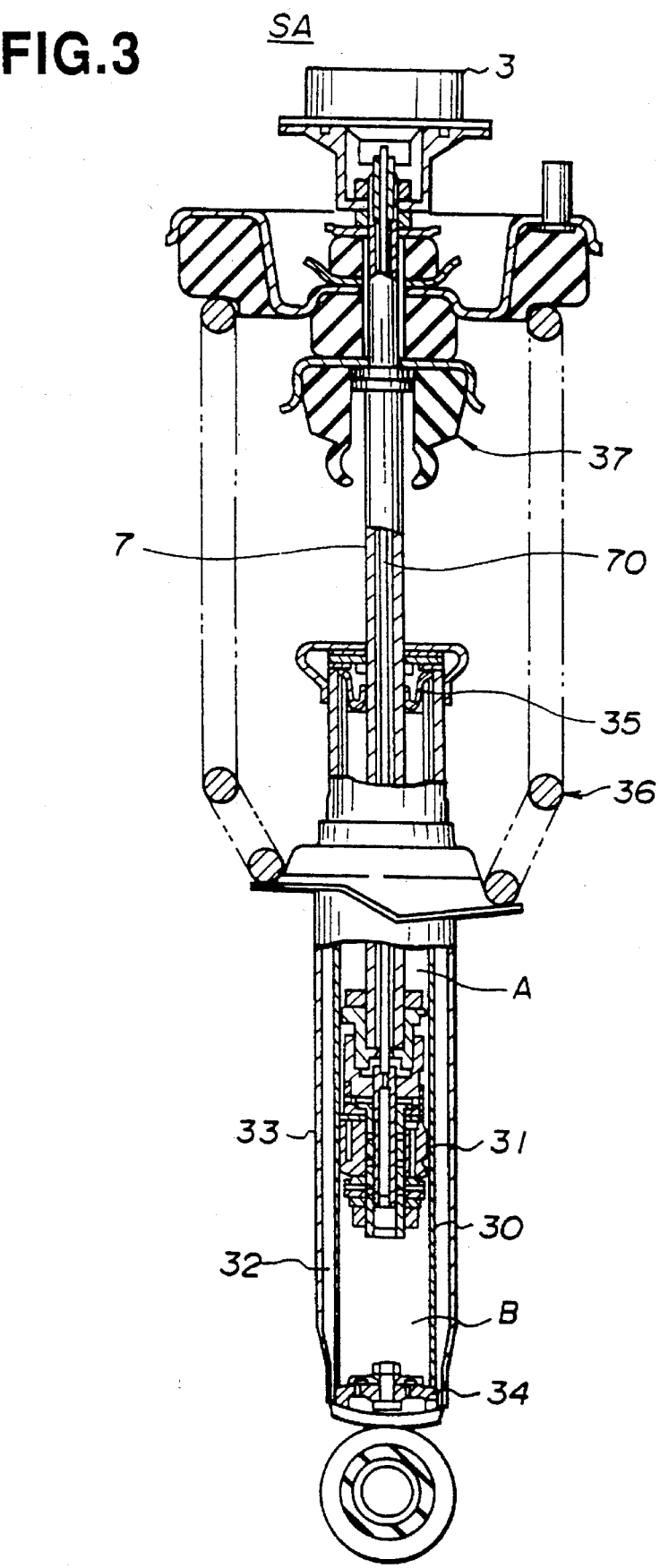
FIG. 3 is a cross sectional view of each shock absorber SA used in the first preferred embodiment shown in FIGS. 1 and 2.

FIG. 3 shows a cross sectional view of each shock absorber SA. The shock absorber SA includes a cylinder 30, a piston 31 defining two chambers, upper chamber A and lower chamber B, an outer envelope 33 which forms a reserve chamber 32 on an outer periphery of the cylinder 30, a base 34 defining the lower chamber B and reserve chamber 32, a guide member 35 which serves as a guide for a slide motion of a piston rod 7 linked to the piston main body 31, a suspension spring 36 interposed between the outer envelope 33 and vehicle body, and a bumper rubber 37.

In FIG. 3, a control rod 70 is penetrated through the piston rod 7 and is rotated (pivoted) by means of the pulse motor 3.

Figure 4:
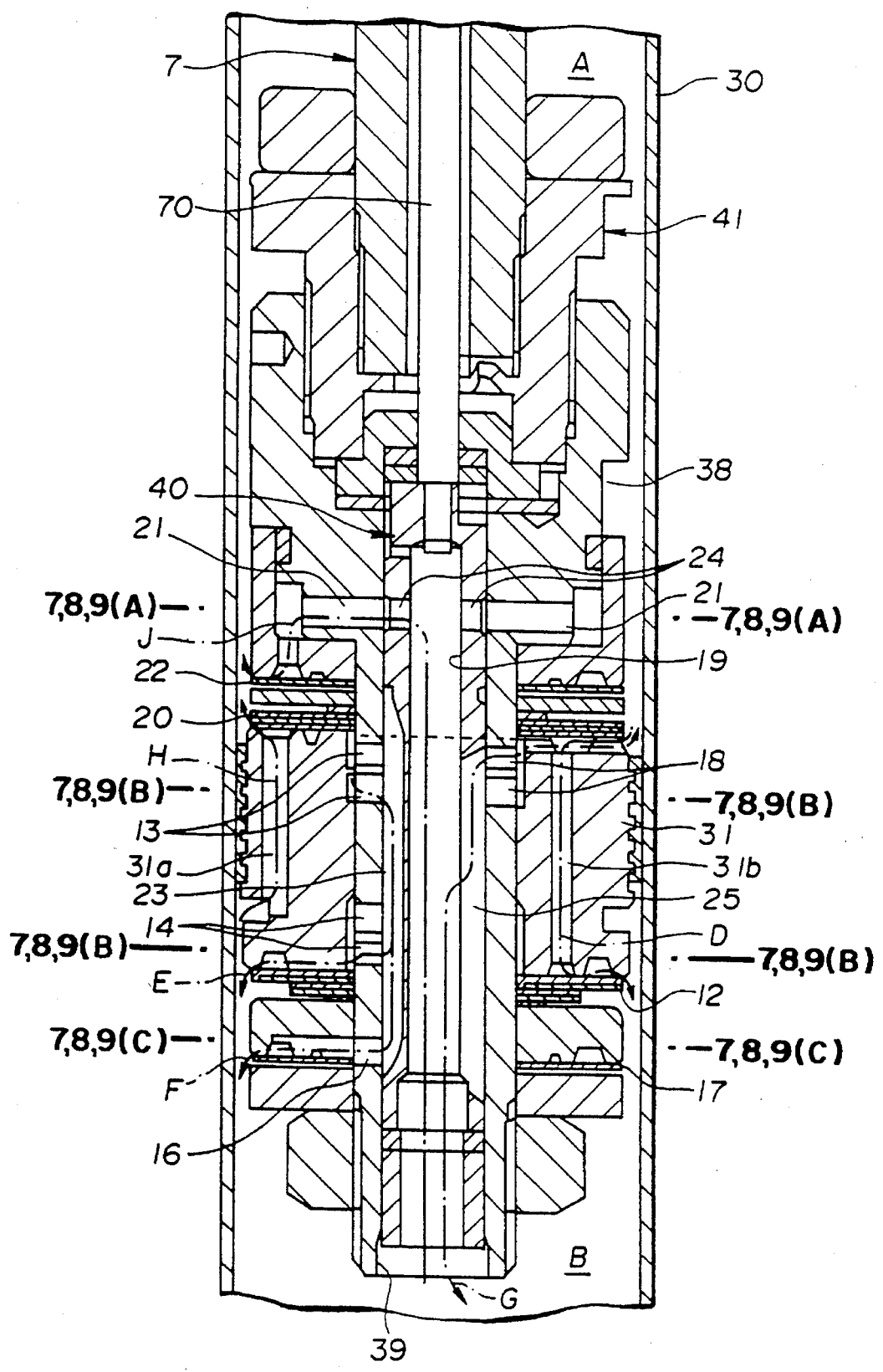
FIG. 4 is a cross sectional view of each shock absorber, particularly, a piston member and its surrounding components of each shock absorber SA shown in FIGS. 2 and 3.

FIG. 4 shows an enlarged cross sectional view of an essential part of the piston 31.

As shown in FIG. 4, two penetrating holes 31a, 31b are formed in the piston 31 and extension stroke side damping valve 12 and compression stroke side damping valve 20 are installed which open and close the corresponding penetrating holes 31a, 31b, respectively. A bounding stopper 41 spirally engaged to a tip of the piston rod 7 is fixed with a stud 38 in the spiral engagement which is penetrated through the piston 31. A communication hole 39 is formed on the stud 38 to form flow passages to communicate a working fluid between the upper chamber A and lower chamber B (extension stroke side second flow passage E, extension stroke side third flow passage F, a bypass passage G, and compression stroke side second flow passage J as will be described later). An adjuster 40 which serves to vary a flow passage cross sectional area is pivotally installed within communication hole 39. An extension stroke side check valve 17 and a compression stroke side check valve 22 are installed on the outer periphery of the stud 38 which enable and interrupt the flow pass at the flow passage formed with the communication hole 39 according to a direction of flow communication of the working fluid.

It is noted that the control rod 70 is linked to the adjuster 40. The stud 38 is formed with first port 21, second port 13, third port 18, fourth port 14, and a fifth port 16 in the upper positional order.

On the other hand, a hollow portion 19 is formed in the adjuster 40, a first lateral hole 24 and second lateral hole 25 being formed therein. A longitudinal groove 23 is formed on an outer periphery of the adjuster 40.

The flow passages through which the working fluid can be communicated between the upper chamber A and lower chamber B at the time of the extension stoke of the piston 31 include: a) an extension stroke side first flow passage D which is provided to pass the working fluid through the penetrating hole 31b and internal side of opened valve of the extension stroke side damping valve 12 to the lower chamber B; b) the extension stroke side second flow passage E which passes through the second port 13, longitudinal groove 23, and fourth port 14 and which passes through an outer periphery of the opened valve of the extension stroke side damping valve 12; c) the compression stroke side third flow passage F which passes through the second port 13, longitudinal groove 23, and fifth port 16 and opened valve of the extension stroke side check valve 17 and extended toward the lower chamber B; and d) the bypass passage G which passes through the third port 18, second lateral hole 25, and hollow portion 19.

On the other hand, the flow passages through which the working fluid can be communicated between the upper chamber A and lower chamber B at the time of the compression stroke side of the piston 31 includes: a) the compression stroke side first flow passage H which passes through the penetrating hole 31a and opened valve of the compression stroke side damping valve 20; b) the compression stroke side second flow passage J which passes through the hollow portion 19, first lateral hole 24, and first port and the opened valve of the compression stroke side check valve 22 toward the upper chamber A; and c) the bypass passage G which passes through the hollow portion 19, second lateral hole 25, and third port 18 toward the upper chamber A.

That is to say, the shock absorber SA has the damping force characteristic such that the characteristic of the damping force is changeable from a low damping force (soft) to a high damping force (hard) at either of the extension and compression stroke sides in response to a pivotal motion of the adjuster 40.

Figure 5:
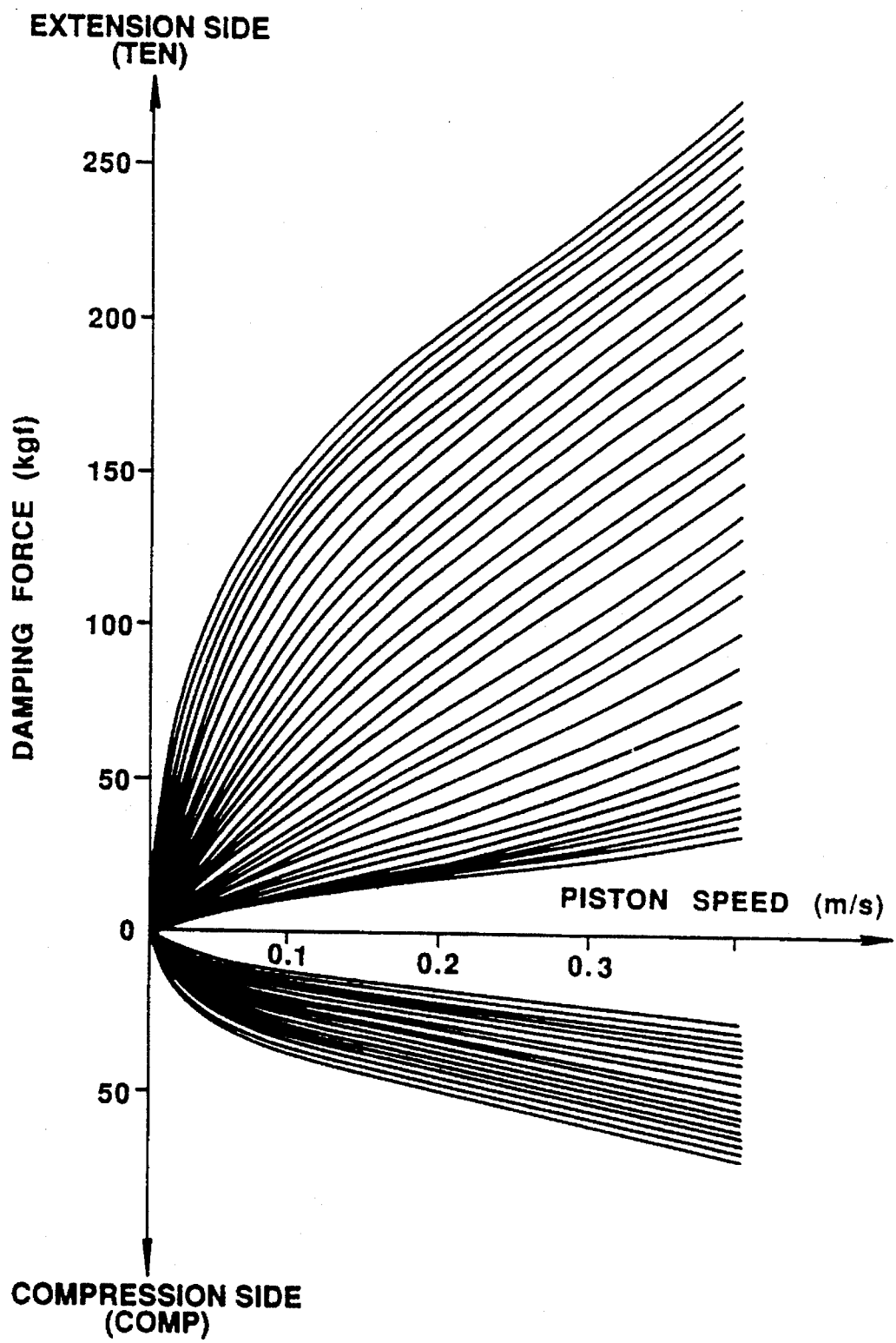
FIG. 5 is a damping force characteristic graph of each shock absorber SA shown in FIGS. 2 through 4.

In the first embodiment, since the damping force characteristic is so structured as to enable to be proportionally changed at a multiple stage as shown in FIG. 5. Such a characteristic as shown in FIG. 5 is also called damping coefficient.

Figure 6:
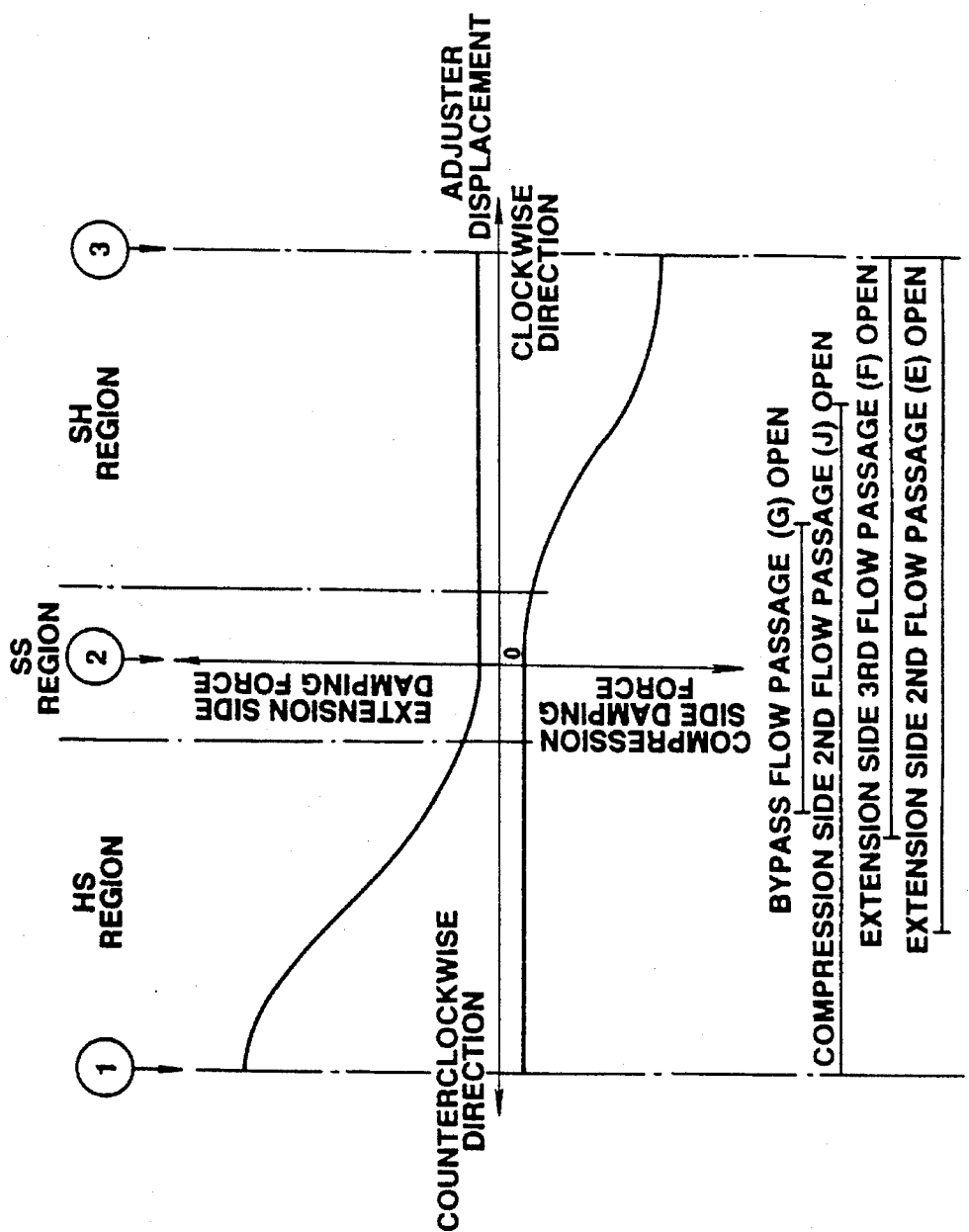
FIG. 6 is a characteristic curve when an adjuster of each absorber SA is pivoted in either clockwise or counterclockwise direction with a zero damping force point as a center.

As shown in FIG. 6, when the adjuster 40 is pivoted in a counterclockwise direction from a position at which both extension and compression stroke sides provide soft damping forces(hereinafter, referred to as the soft, characteristic region SS), only the damping force at the extension stroke side can be varied at the multiple stage and the compression stroke side is fixed at the low damping coefficient value (Hereinafter, called the extension stroke side hard characteristic region HS).

On the contrary, if the adjuster 40 is pivoted in a clockwise direction, only the compression stroke side provides the multiple stage of damping coefficients but the extension stroke side is fixed to the low damping coefficient (hereinafter, referred to as the compression stroke side hard characteristic region SH).

Figure 7A:
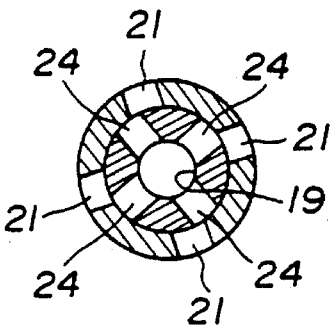
FIGS. 7(A) through 7(C) are laterally cross sectional views cut way along a line K—K of FIG. 4.
Figure 7B:
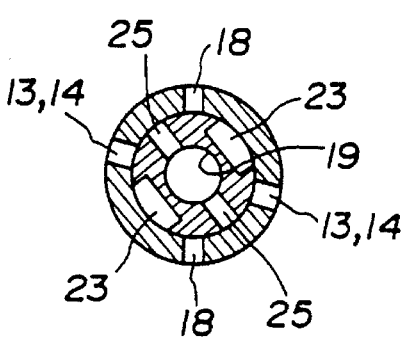
Figure 7C:
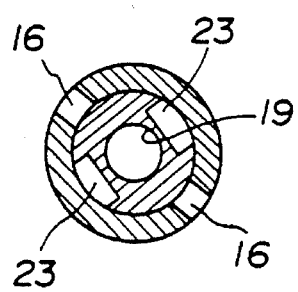
Figure 8A:
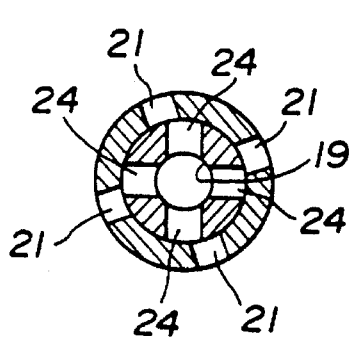
FIGS. 8(A) through 8(C) are laterally cross sectional views cut away along a line L—L and along a line M—M of FIG. 4.
Figure 8B:
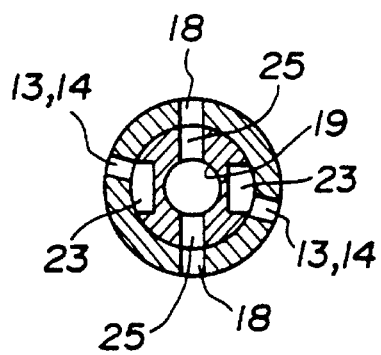
Figure 8C:
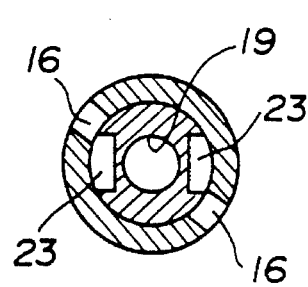
Figure 9A:
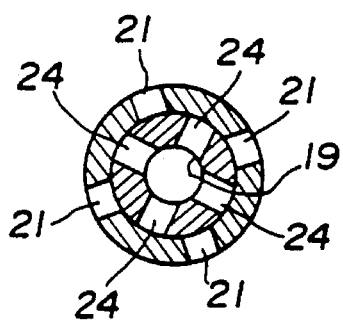
FIGS. 9(A) through 9(C) are laterally cross sectional views cut way along a line N—N of FIG. 4.
Figure 9B:
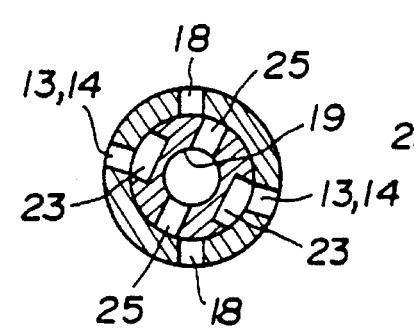
Figure 9C:
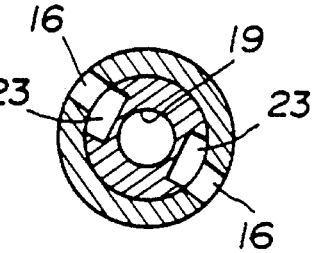

In FIG. 6, when the adjuster 40 is positioned at pivoted positions of ①, ② and ③, the cross section of the piston cut way along the line K—K are shown in FIGS. 7(A), 7(B), and 7(C), respectively, those the so lines L—L and M—M are shown in FIGS. 8(A) through 8(C), respectively, and those along the line N—N are shown in FIGS. 9 (A) through 9 (C), respectively.

Figure 10:
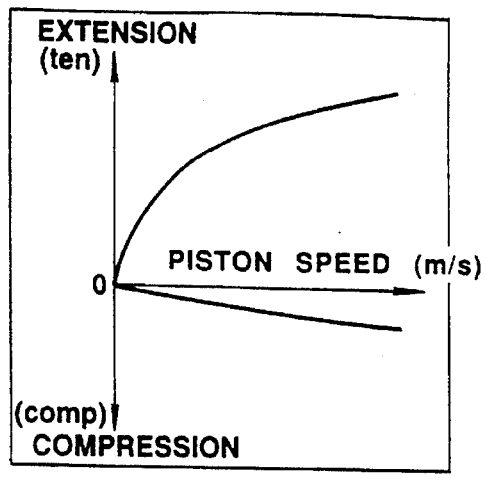
FIGS. 10 through 12 are characteristic curves of damping forces at both extension and compression stroke sides in each shock absorber SA with respect to a piston speed shown in FIGS. 3 and 4.
Figure 11:
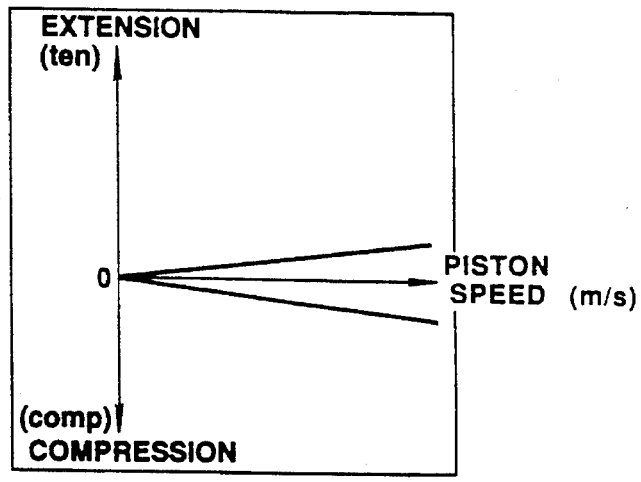
Figure 12:
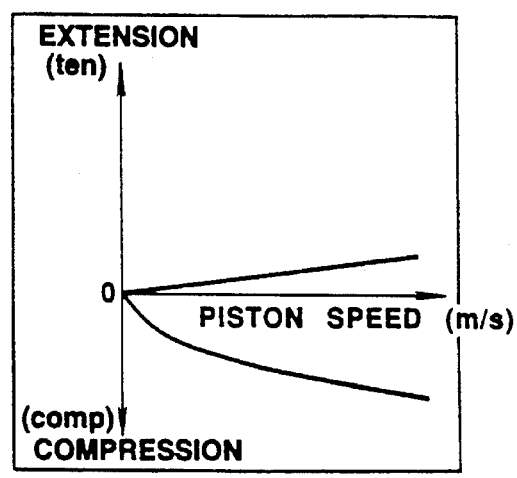

FIGS. 10, 11, and 12 show characteristics of the damping forces at the respective positions of ①, ②, and ③ shown in FIG. 6.

Figure 14A:
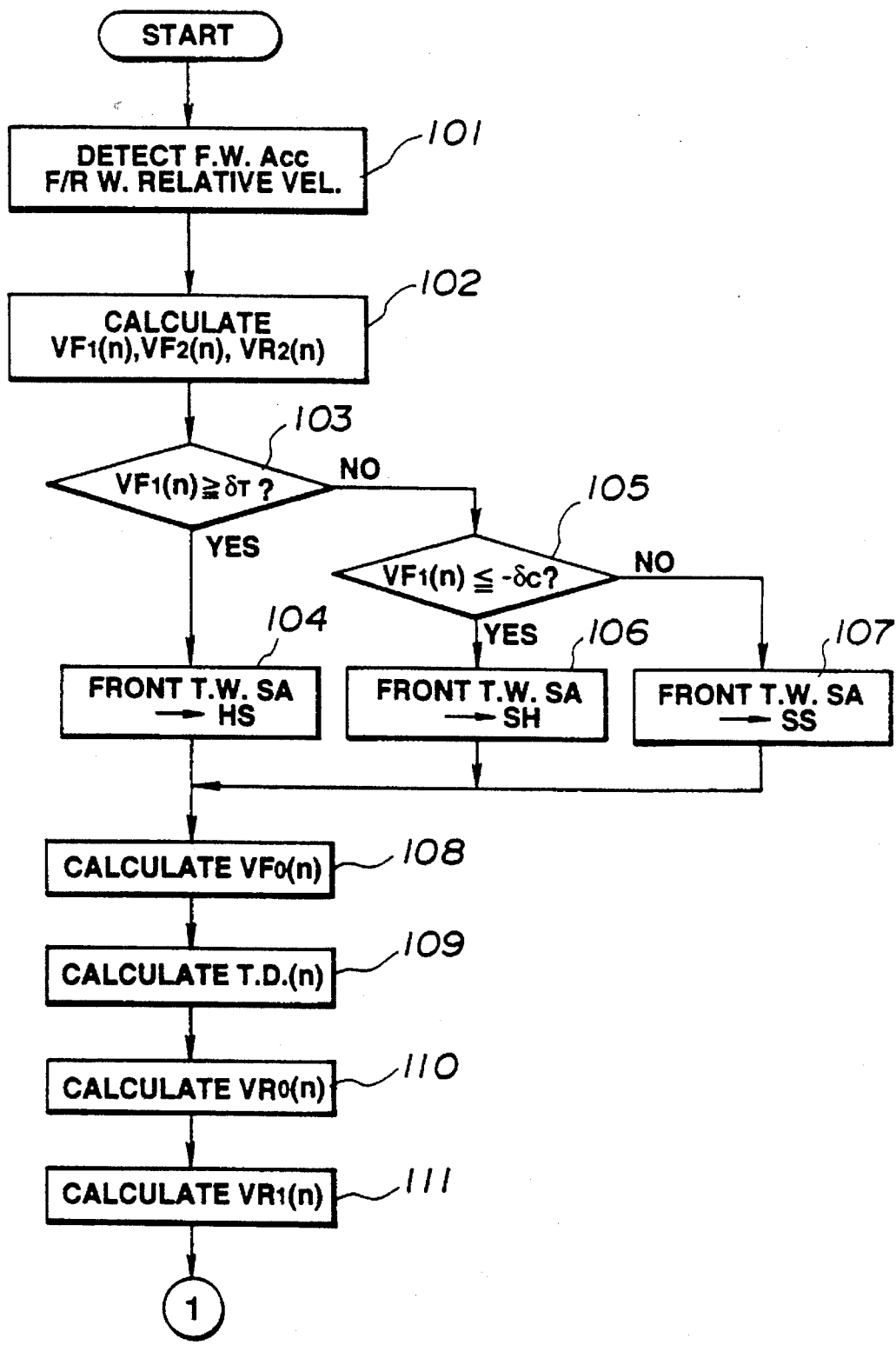
FIGS. 14(A) and 14(B) are integrally an operational flowchart executed by a control unit shown in FIGS. 1 and 2 in the case of the first embodiment.
Figure 14B:
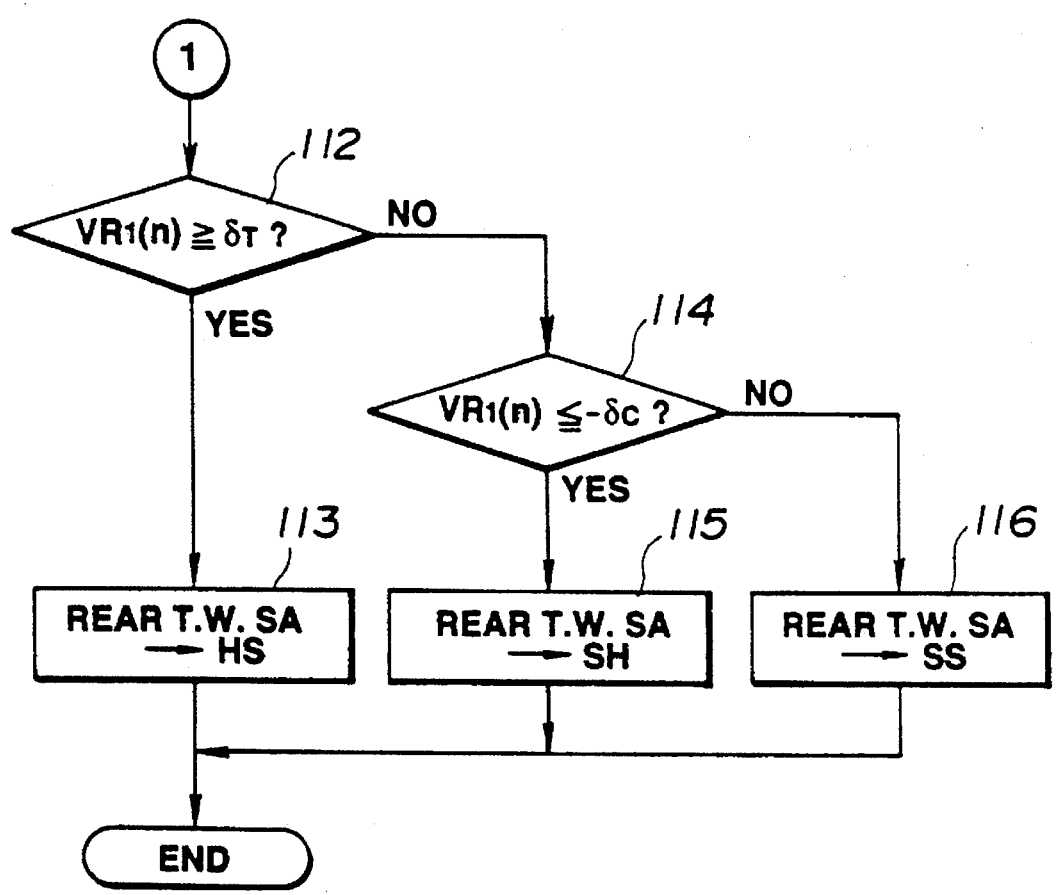

FIGS. 14(A) and 14(B) show a series of operational flowcharts executed by the control unit 4 which controls the drive of the pulse motor 3 so as to control the damping force for each or any one of the shock absorbers SA. It is noted that the program routine shown in FIG. 13 is executed for each shock absorber, independently.

At a step 101, the CPU 4b reads the sprung mass vertical accelerations from the sprung mass vertical G sensors $1_1$ and $1_2$ located at the front left and right tire wheels and reads relative displacements between the sprung mass and unsprung mass from each vehicular height sensor $2_1$, $2_2$, and $2_3$ at the front and rear tire wheel sides.

At a step 102, the CPU 4b calculates sprung mass vertical speeds $v_{F1(n)}$ by integrating the detected sprung mass vertical accelerations and calculates relative velocities $v_{F2(n)}$ and $v_{R2(n)}$ from the detected relative displacements. It is noted that if the signs of $v_{F1(n)}$, $v_{F2(n)}$, and $v_{R2(n)}$ indicate positive (+), the direction thereof is in an upper direction and if those indicate negative (−), the direction thereof is in a lower direction.

At a step 103, the CPU 4b determines whether the sprung mass vertical speed $v_{F1(n)}$ is equal to or larger than a plus predetermined threshold value $\delta_T$. If Yes at the step 103, the routine goes to a step 104. If No at the step 103, the routine goes to a step 105.

At the step 104, the front tire wheel side shock absorbers $SA_1$ and $SA_2$ are controlled toward the extension stroke side hard region HS.

At the step 105, the CPU 4b determines whether the sprung mass vertical speed $v_{F1(n)}$ is negatively below a minus predetermined value $-\delta_C$. If Yes at the step 105, the routine goes to a step 106. If No at the step 105, the routine goes to a step 107.

At the step 106, the front tire wheel side shock absorbers $SA_1$ and $SA_2$ are controlled in the compression hard region SH.

At the step 107, the front tire wheel side shock absorbers $SA_1$ and $SA_2$ are controlled in the soft region SS.

At the step 108, the CPU 4b calculates a front tire wheel side road surface input speed $v_{F0(n)}$ on the basis of the numerical equation:

$$v_{F0(n)} = v_{F1(n)} - v_{F2(n)}.$$

It is noted that a subscript symbol $_{(n)}$ in the equations denotes the number of control routines the CPU 4b executes.

At a step 109, the CPU 4b calculates which number of routines (m) of the control routine shown in FIGS. 14(A) and 14(B) corresponds to a time difference between a time at which the front tire wheels have passed on a part of the running road and a time at which the rear tire wheels have arrived at the same part of the road surface using the following equation:

$m$=wheel base/vehicle speed×1/$\Delta t$.

It is noted that in the above equation $\Delta t$ denotes a time during which the single routine has been executed.

At a step 110, the CPU 4b calculates a rear tire wheel road surface input velocity $v_{R0(n)}$ using the following equation. That is to say, the data at the front tire wheel sides, which corresponds to the return in time by the number of control routines (m) corresponding to the time difference passed on the same part of the road surface by the front and rear tire wheels as the data at the rear tire wheel sides.

$$v_{R0(n)}=v_{F0(n-m)}.$$

At a step 111, the CPU 4b calculates the rear tire wheel side sprung mass vertical velocity $v_{R1(n)}$ using the following equation:

$$v_{R1(n)}=v_{R0(n)}+v_{R2(n)}.$$

Next, the routine goes to a flowchart of FIG. 14 (B).

At a step 112, the CPU 4b determines whether the sprung mass vertical velocity $v_{R1(n)}$ is negatively below the predetermined minus threshold value $-\delta_C$. If Yes at the step 112, the routine goes to a step 113. If No, the routine goes to a step 114.

At the step 113, the CPU 4b is operated to control the rear tire wheel side shock absorbers $SA_3$ and $SA_4$ in the extension stroke side hard region HS.

At the step 114, the CPU 4b determines whether the sprung mass vertical velocity $v_{R1(n)}$ is negatively below the minus predetermined threshold value $-\delta_C$. If Yes at the step 114, the routine goes to a step 115. If No at the step 114, the routine goes to a step 116.

At the step 115, the CPU 4b issues the drive command to the pulse motor 3 to control the rear tire wheel side shock absorbers $SA_3$ and $SA_4$ in the compression stroke side hard region SH.

At the step 116, the CPU 4b issues the drive command to the pulse motor 3 to control the rear tire wheel side shock absorbers $SA_3$ and $SA_4$ in the soft region SS.

As described hereinabove, the damping force characteristic control is carried out for the front tire wheel side shock absorbers $SA_1$ and $SA_2$ on the basis of the front tire wheel side sprung mass vertical velocity $v_{F1(n)}$. On the other hand, for the rear tire wheel side shock absorbers $SA_3$ and $SA_4$, the damping force characteristic control is carried out as follows:

First, the front tire wheel side sprung mass velocities $v_{F1(n)}$ and front tire wheel side relative velocities $v_{F2(n)}$ as the detected data at the front tire wheel sides are used to calculate the front tire wheel side road surface input velocity $v_{F0(n)}$.

Secondly, the rear tire wheel side road surface input velocity $v_{R0(n)}$ (=$v_{F0(n-m)}$) is predictively derived from the vehicle speed and wheel base.

Thirdly, on the basis of the calculated front tire wheel side road surface input velocity $v_{F0(n)}$, rear tire wheel side road surface input velocity $v_{R0(n)}$, and rear tire wheel side sprung mass vertical velocity $v_{R1(n)}$ as a predicted value calculated from the rear tire wheel side relative velocity $v_{R2(n)}$, the damping force characteristic control therefor is carried out.

That is to say, as appreciated from above, the rear tire wheel side vertical G sensor is not necessary.

Next, an action of the first preferred embodiment described above will be explained below with reference to FIGS. 15(A) through 15(D).

As shown in FIG. 15(A), suppose that the sprung mass vertical velocities of $v_{F1(n)}$ and $v_{R1(n)}$ are varied as if they were sinusoidal waves.

If $v_{F1(n)}$ and $v_{R1(n)}$ have values falling in a range between the plus and minus predetermined threshold values $+\delta_T$—$\delta_C$, the shock absorbers SA are controlled in the soft region SS.

On the other hand, if $v_{F1(n)}$ and $v_{R1(n)}$ exceed the plus predetermined threshold value $+\delta_T$, the shock absorbers SA are controlled in the extension hard region HS and the compression stroke side is fixed to the low damping force characteristic. In addition, the damping characteristic at the extension stroke side is varied in proportion to the sprung mass vertical velocities $v_{F1(n)}$, $v_{R1(n)}$, respectively. At this time, the damping force characteristic C is controlled to provide C=k·$v_{F1(n)}$, C=k·$v_{R1(n)}$.

It is noted that k denotes a proportional constant.

On the other hand, when $v_{F1(n)}$, $v_{R1(n)}$ are negatively lower than the minus predetermined threshold value $-\delta_C$, the damping force characteristic is controlled in the compression hard region SH and the extension stroke side is fixed to the low damping force characteristic. In addition, the damping force characteristic at the compression stroke side is varied in proportion to $v_{F1(n)}$, $v_{R1(n)}$. At this time, the damping characteristic C is set to provide C=k·$v_{F1(n)}$, C=k·$v_{R1(n)}$.

As described above, in the first embodiment of the system for controlling the damping force characteristics for the respective shock absorbers of the vehicle, when the sprung mass vertical velocity and relative velocity between the sprung mass and unsprung mass have the same sign (plus or minus) (refer to regions denoted by b and d in FIG. 15 (B)), the corresponding stroke side of the shock absorber SA with respect to the piston is controlled to provide the hard damping force characteristic. If they have the different signs (refer to regions denoted by a, c in FIG. 15 (B)), the corresponding stroke side of the shock absorber SA is controlled to the soft characteristics (SS).

Such a control mode as described above is the same as the control of damping force based on a so-called "Sky Hook" theory.

If the control region is transferred from so region a to region b and from region c to region d, the switching of the damping force characteristic control mode can be carried out without drive to the pulse motor 3.

In the case of the first preferred embodiment, the following effects can be achieved.

1) Since the vertical G sensor to be located at the rear tire wheels can be omitted, the total system manufacturing cost can be reduced.

2) Since as compared with a conventional damping force characteristic control based on the Sky Hook theory, a frequency at which the damping force characteristic switching is carried out via the pulse motor, the control responsive characteristic can be improved, the durability of the pulse motor, and electric power consumption can accordingly be saved.

As an alternative (modification) of the first embodiment, when the control unit 4b determines the rear tire wheel side road surface input velocity $v_{R0(n)}$ from the front tire wheel side road surface input velocity $v_{F0(n)}$ and rear tire wheel side relative velocity $v_{R2(n)}$, a slight prior detection data is used as the front tire wheel side road surface input velocity $v_{R0(n)}$ which is earlier than the time difference between the front tire wheels and rear tire wheels by which the tire wheels have passed on the same road surface.

In this alternative of the first embodiment, since the road surface input velocity at the rear tire wheel side can be predicted previously, a timing at which the damping force characteristic is switched can be preceded by the road surface input to the rear tire wheels so that, particularly, a magnitude of transmission of vibration to the sprung mass at the rear tire wheel side can be reduced with respect to a high frequency input requiring a high responsive characteristic.

In the first embodiment, the damping force characteristic control is carried out on the basis of the sprung mass vertical velocities. The specific content of control is arbitrary. For example, the switching control of the damping force characteristic can be carried out depending on whether the direction of the sprung mass vertical velocity and that of the relative velocity between the sprung mass and unsprung mass have the same or reverse directions.

In the first embodiment, the vehicular height sensors are used as relative displacement detecting means. However, other weight sensors or other displacement sensors may be used.

In the first embodiment, the vertical G sensors and vehicular height sensors are individually installed at respective tire wheel positions of the vehicle. The vertical G sensor and height sensor may be installed at a weight center of the vehicle, i.e., approximately a center position of the vehicle.

Although the shock absorbers either of which stroke sides are variable (for example, in one stroke side, the hard damping force characteristics can be variably obtained and in the opposite stroke side can be fixed to the soft damping force side) are used as SA, other shock absorbers whose stroke directions of both are variable and varied in the same direction may be used.

(Second Embodiment)

Figure 17:
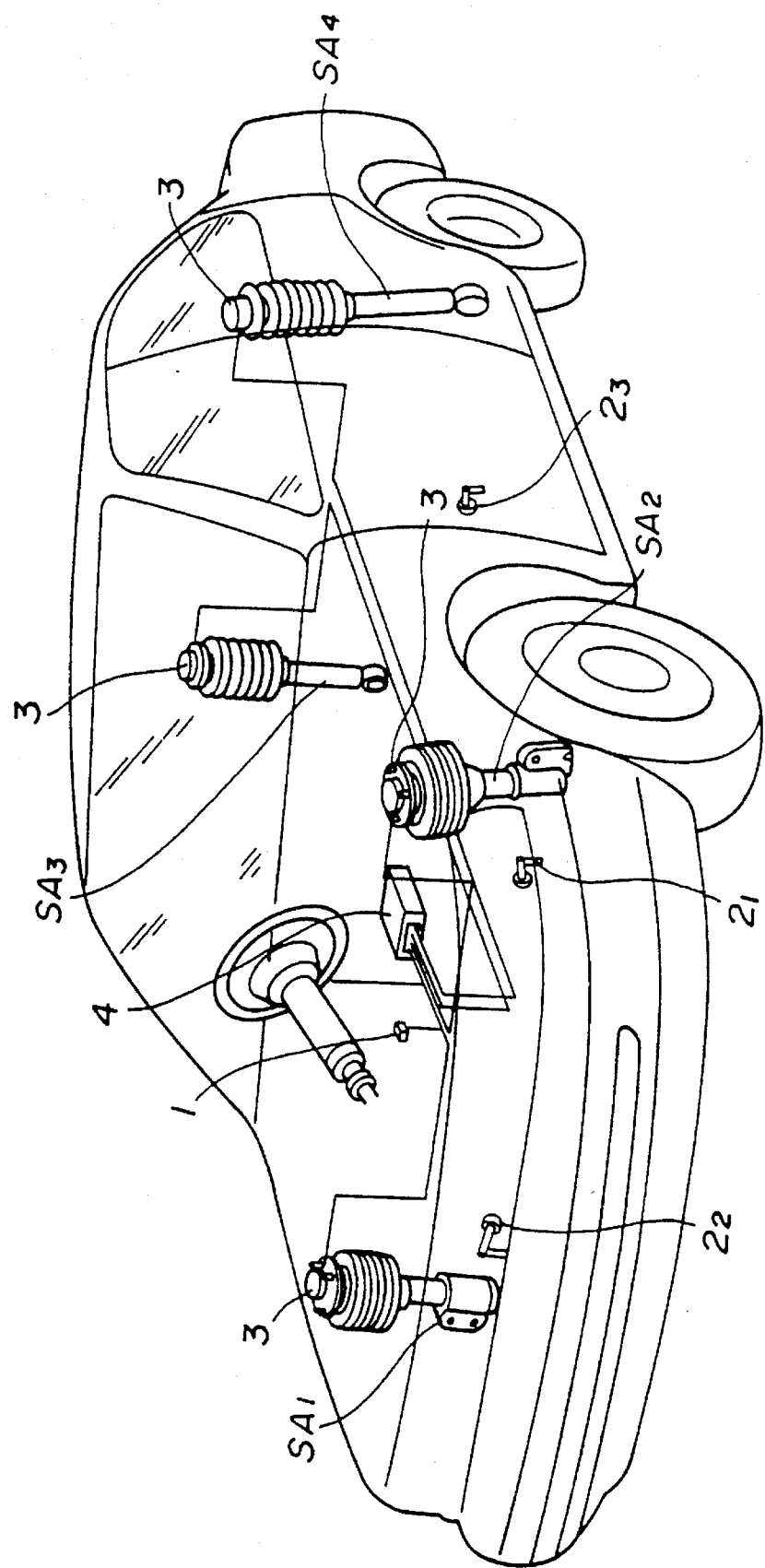
FIG. 17 is a schematic perspective view of the damping force characteristic controlling system in a second preferred embodiment according to the present invention.

FIG. 17 shows a second preferred embodiment of the damping force characteristic controlling system according to the present invention applicable to the vehicle.

Figure 18:
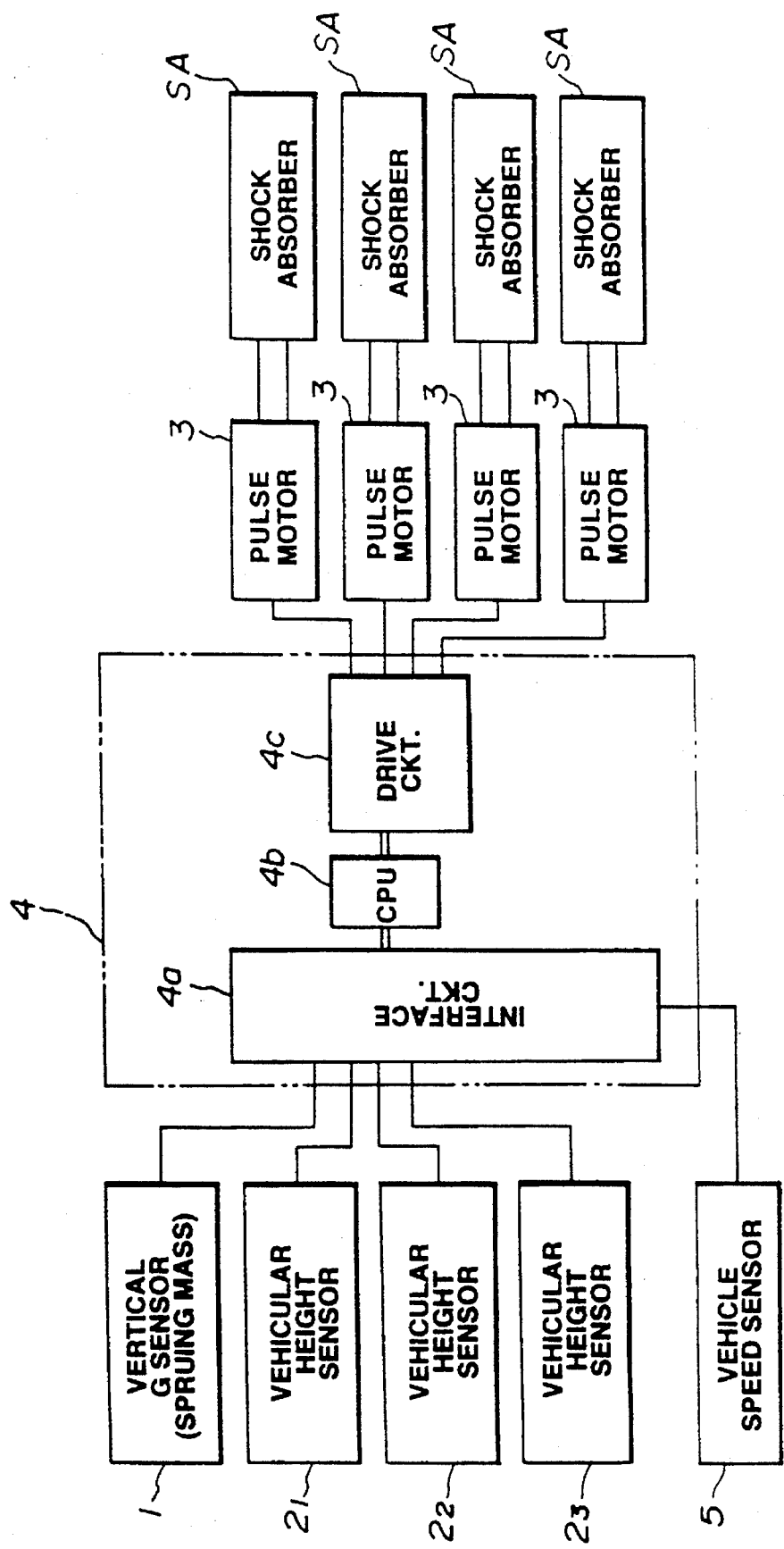
FIG. 18 is a schematic circuit block diagram of the second preferred embodiment shown in FIG. 17.

FIG. 18 shows a circuit block diagram of the damping force characteristic controlling system in the second embodiment shown in FIG. 17.

Figure 21:
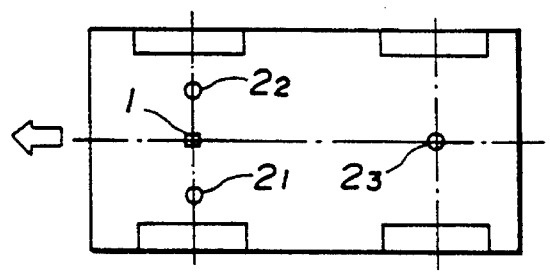
FIG. 21 is a schematic positional view of each of front tire wheel side vertical G sensor and three vehicular height sensors used in the second preferred embodiment shown in FIGS. 17 and 18.

As shown in FIGS. 17 and 18, the structure so difference from that of the first embodiment is the use of a single vertical G sensor 1 which is installed on a part of the vehicle body which is on a center of a straight line connected between the two front tire wheels. This is appreciated from FIG. 21. The vertical G sensor 1 serves to detect the vertical acceleration on the sprung mass at the front tire wheel side.

The front tire wheel side vehicle height sensors $2_1$ and $2_2$ are installed on parts of the vehicle body adjacent to the mounting positions of the left and right front tire wheel shock absorbers $SA_1$ and $SA_2$.

The control unit 4 is installed, as in the same way as the first embodiment, on a part of the vehicle body adjacent to a driver's seat of the vehicle which receives output signals from the vertical G sensor 1 described above, vehicular height sensors 2 ($2_1$, $2_2$, $2_3$), and vehicle speed sensor 5 and outputs the control signal to any one, each, or all of the pulse motors 3 associated with the shock absorbers SA.

The control unit 4 includes the interface circuit 4a, the CPU (Central Processing Unit) 4b, and the drive circuit 4c.

The structure of the shock absorbers is the same as in the case of the first embodiment. Therefore, the detailed description thereof will be omitted herein.

Next, an operational flowchart executed by the control unit 4 shown in FIG. 18 will be described below with reference to FIG. 19.

Figure 19:
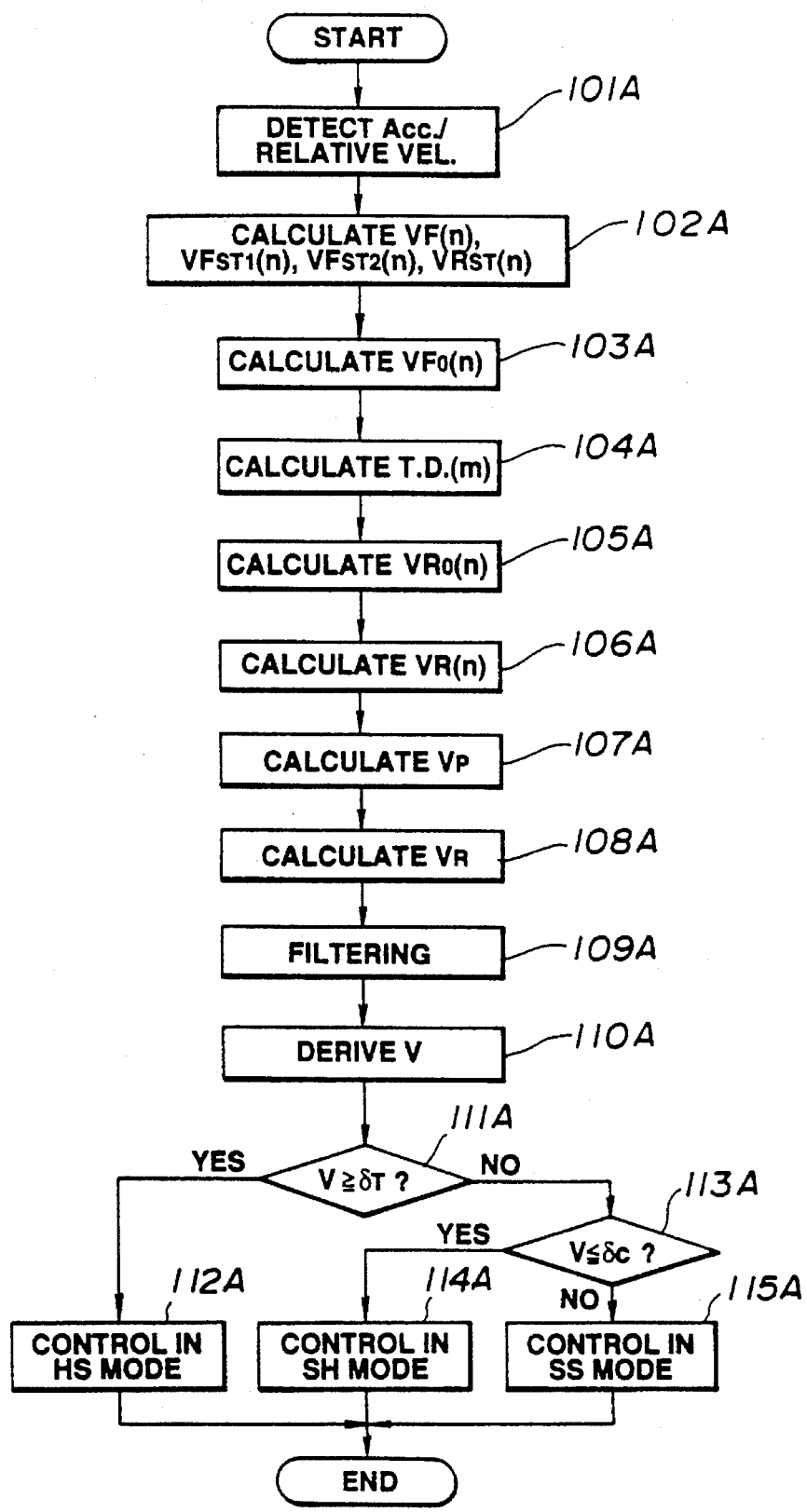
FIG. 19 is an operational flowchart executed by the control unit shown in FIG. 18 in the case of the second preferred embodiment.

In FIG. 19, at a step 101A, the CPU 4b determines the sprung mass vertical acceleration from the output signal of the vertical G sensor 1 located at the center of the front tire wheels described above.

In addition, at the step 101A, the CPU 4b determines relative displacement between the sprung mass and unsprung mass from the three vehicular height sensors 2 ($2_1$, $2_2$, and $2_3$).

At a step 102A, the CPU 4b determines the sprung mass vertical velocity (upward or downward) $v_{F(n)}$ from an integration of the determined vertical acceleration at the step 101A from the vertical G sensor 1 located at a center position between the left and right front tire wheels and, in addition, determines relative velocities $v_{ST1(n)}$, $v_{ST2(n)}$, and $v_{ST(n)}$ from the determined relative displacements at the front left and right tire wheel sides and at the rear tire wheels' center side. It is noted that the sprung mass vertical velocity $v_{F(n)}$ and relative velocities $v_{FST1(n)}$, $v_{FST2(n)}$, $v_{RST(n)}$ have the positive signs when they indicate upward directions and have the negative signs when they indicate downward directions. It is also noted that (n) denotes a number of control routines that the control unit executes the routine shown in FIG. 19.

Referring back to FIG. 19, at a step 103A, the CPU 4b determines the front tire wheel side road surface input velocity $v_{F0(n)}$ at the front left and right tire wheel sides on the basis of the equation defined below.

$$v_{F0(n)}=v_{F(n)}-(v_{ST1(n)}+v_{FST2(n)})/2$$

At a step 104A, the CPU 4b determines which number (m) of routines the CPU executes corresponds to a time difference between a time at which the front tire wheels have passed a road surface and a time at which the rear tire wheels have passed the same road surface from an equation described below:

$$m=(wheel\ base)/(vehicle\ speed \times 1/\Delta t.$$

It is noted that at denotes a time during which the CPU 4b executes the single routine of FIG. 19.

At a step 105A, the CPU 4b determines the road surface input velocity $v_{R0(n)}$ at the rear tire wheel sides on the basis of the following equation.

That is to say, the step 105A serves to use the data on the front tire wheel side road input surface velocity which is prior by the m-th number of routine corresponding to the same road passed time difference between those at the front tire wheel sides and rear tire wheel sides as the road surface input velocity at the rear tire wheel sides on the basis of the following equation.

$$v_{R0(n)}=v_{F0(n-m)}.$$

At a step 100A, the CPU 4b determines the sprung mass vertical velocity $v_{R(n)}$ at the rear tire wheel sides using such an equation as;

$$v_{R(n)}=v_{R0(n)}+v_{ST(n)}.$$

At a step 107A, a pitch component $v_P$ of the vehicle body is determined for each shock absorber SA using the following equations;

$$FLv_P, FRv_P=v_{F(n)}-v_{R(n)}.$$

$$FLv_P, RRv_P=v_{R(n)}-v_{F(n)}.$$

It is noted that FL denotes the front left tire wheel side, FR denotes the front right tire wheel side, RL denotes the rear left tire wheel side, and RR denotes the rear right tire wheel side and those symbols correspond to respective positions of the shock absorbers;, $SA_1$, $SA_2$, $SA_3$, and $SA_4$.

At a step 108A, the GPU 4b determines the roll component $V_R$ of the vehicle body on the basis of the following equations.

$FLv_R, RLv_R = v_{FST1(n)} - v_{FST2(n)}.$ $FRv_R, RRv_R = v_{FST2(n)} - v_{FST1(n)}.$

At a step 110A, the CPU 4b determines the control signals V for the respective numerical equations.

$FLV = \alpha_1 \cdot v_{F(n)} + \beta_1 \cdot FLv_P + \tau_1 \cdot FLv_R,$ $FRV = \alpha_1 \cdot v_{F(n)} + \beta_1 \cdot FRv_P + \tau_1 \cdot FRv_R,$ $RLV = \alpha_2 \cdot v_{R(n)} + \beta_2 \cdot RLv_P + \tau_2 \cdot RLv_R,$ $RRV = \alpha_2 \cdot v_{R(n)} + \beta_2 \cdot RRv_P + \tau_2 \cdot RRv_R,$ It is noted that $\alpha_1$, $\beta_1$, and $\tau_1$ denote respective proportional constants for the front tire wheel sides and $\alpha_2$, $\beta_2$, and $\tau_2$ denote respective proportional constants for the rear tire wheel sides.

In addition, first terms of the respective equations including $\alpha_1$ and $\alpha_2$ denote bounce rates and those including $\beta_1$ and $\beta_2$ denote pitch rates, and those including $\tau_1$ and $\tau_2$ denote roll rates.

At a step 111A, the CPU 4b determines whether each of the control signals determined as described above is above a plus predetermined value $\delta_T$. If Yes at the step 111A, the routine goes to a step 112A. If No at the step 111A, the routine goes to a step 113A.

At the step 112A, each shock absorber $SA_1$, and $SA_2$ ($SA_3$, and $SA_4$) is controlled in the extension stroke side hard region HS.

At the step 113A, the CPU 4b determines whether each of the control signals is negatively lower than a minus predetermined value $-\delta_C$. If Yes at the step 113A, the routine goes to a step 114A. If No at the step 113A, the routine goes to a step 115A.

At the step 114A, each shock absorber $SA_1$, $SA_2$ ($SA_3$ and $SA_4$) is controlled to provide the compression stroke side hard region SH.

At the step 115A, each shock absorber $SA_1$, $SA_2$ ($SA_3$, $SA_4$) is controlled to provide the soft regions SS.

As described above, in the second embodiment, the shock absorbers $SA_1$ and $SA_2$ at the front tire wheel sides are controlled on the basis of the front tire wheel side sprung mass vertical velocity $v_{F(n)}$. However, for the shock absorbers $SA_3$ and $SA_4$ at the rear tire wheel sides, the front tire wheel side input velocity $v_{FO(n)}$ is first determined according to the front tire wheel side detected values, i.e., the sprung mass vertical velocity $v_{F(n)}$ at the front tire wheel side and relative velocities $v_{FST1(n)}$ and $v_{FST2(n)}$ between the sprung mass and unsprung mass at the front tire wheel sides and the damping force characteristic control is carried out on the basis of the rear tire wheel side road surface input velocity $v_{RO(n)}$ at the rear tire wheel sides ($v_{RO(n)} = v_{FO(n-m)}$) calculated from the front tire wheel side road surface input velocity $v_{FO(n)}$, wheel base, and vehicle speed and the rear tire wheel sprung mass vertical velocity $v_{R(n)}$ calculated from the rear tire wheel side relative velocity $v_{RST(n)}$ between the sprung mass and unsprung mass.

That is to say, the control routine in the case of the second embodiment requires no vertical G sensor used at the rear tire wheel sides.

FIGS. 20(A) through 20(D) are integrally a timing chart for explaining the operation in the case of the second preferred embodiment.

Figures 20A, 20B, 20C, 20D:
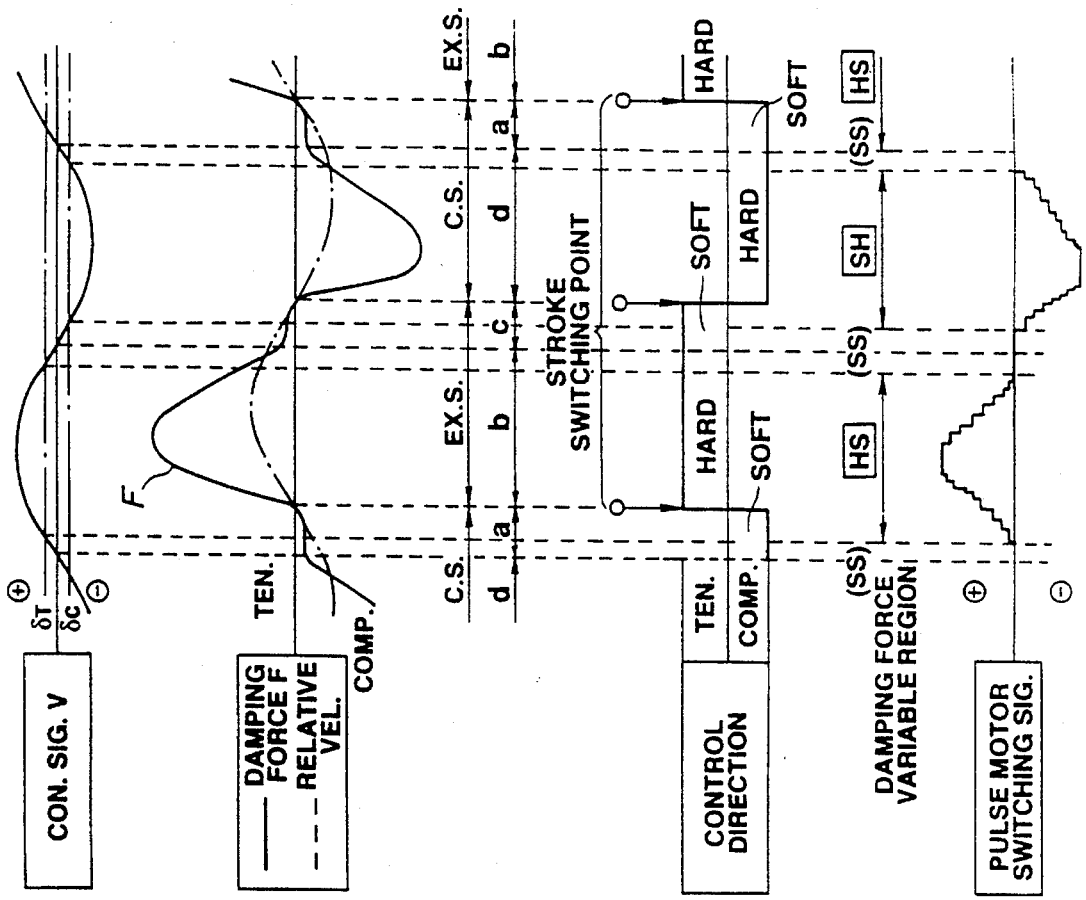
FIGS. 20(A) through 20(D) are integrally a timing chart of each signal in the case of the second preferred embodiment shown in FIGS. 17 and 18.

The control signal V based on the sprung mass vertical velocity $v_{F(n)}$ ($v_{R(n)}$) is varied as shown in FIG. 20(A), the shock absorbers SA are controlled in the soft regions SS when the control signal V falls in a value between the plus predetermined threshold value $\delta_T$ and the minus predetermined threshold valve $+\delta_C$.

In addition, when the control signal V is above the plus predetermined threshold value $+\delta_T$, the shock absorbers SA are controlled to provide the extension stroke side hard regions HS while the compression stroke side is fixed to a low damping force characteristic. In this case, the damping force characteristic at the extension stroke side is proportional to the value of the control signal V. At this time, the damping force characteristic C is expressed as $C = k \cdot V$.

On the other hand, if the control signal V is below the minus predetermined value $-\delta_C$, the shock absorbers are controlled at the compression stroke side hard regions HS while the fixed low damping force characteristic is provided at the extension stroke sides. The damping force characteristic at the compression stroke side is proportional to the value of the control signal V. At this time, the damping force characteristic C is expressed as $C = k \cdot V$.

As described above, in the case of the second embodiment, when the sign of the sprung mass vertical velocity and relative velocity between the sprung mass and unsprung mass are the same sign (regions b and d in FIG. 20 (B)), one of the stroke sides whose direction is the same as the Sign of the above-described relative velocity or sprung mass vertical velocity is set to provide the hard damping force characteristics. If the signs are different from each other (regions of a and c of FIG. 15), both of the stroke sides are set to provide the soft characteristic. This is based on the so called "Sky Hook" theory. Such damping force characteristic controls as described above are carried out by means of the single vertical G sensor 1 and three vehicular height sensors 2. Furthermore, when the region is transferred from the region a to the region b or from the region a to the region d, the switching control of the damping force characteristic control is carried out without drive to the pulse motor 3.

(Third Embodiment)

It is noted that a part of the control routine shown in FIG. 19 of the second embodiment is different from the third preferred embodiment.

In the third embodiment, as in the same way as the modification of the first embodiment, when the rear tire wheel side road surface input velocity $v_{RO(n)}$ is determined from the front tire wheel side road surface input velocity $v_{FO(n)}$ and relative velocity $v_{RST(n)}$ between the sprung mass and unsprung mass at the rear tire wheel sides, a slight prior detection data is used so as the front tire wheel side road input velocity $v_{RO(n)}$ by the passed time difference between the tire wheels at the front tire wheels and rear tire wheels derived according to the wheel base and vehicle speed.

The wheel base is defined as a horizontal distance between the tire axle at the front tire wheels and the tire axle at the rear tire wheels.

In the third embodiment, since the road surface input velocity at the rear tire wheel sides can previously be predicted, the switching timing of the damping force characteristic can precede with respect to the road surface input at the rear tire wheels so that the vibration transmission toward the sprung mass at the rear tire wheel sides can be reduced with respect to the higher frequency input requiring the high responsive characteristic.

(Fourth Embodiment)

In the fourth preferred embodiment, a difference point from the second and third preferred embodiments is that the determination of the pitch component $v_P$.

That is to say, in place of the step 107A shown in FIG. 19, a subroutine of a step 200 to determine the pitch component $v_P$ is executed in the fourth embodiment.

Figure 22:
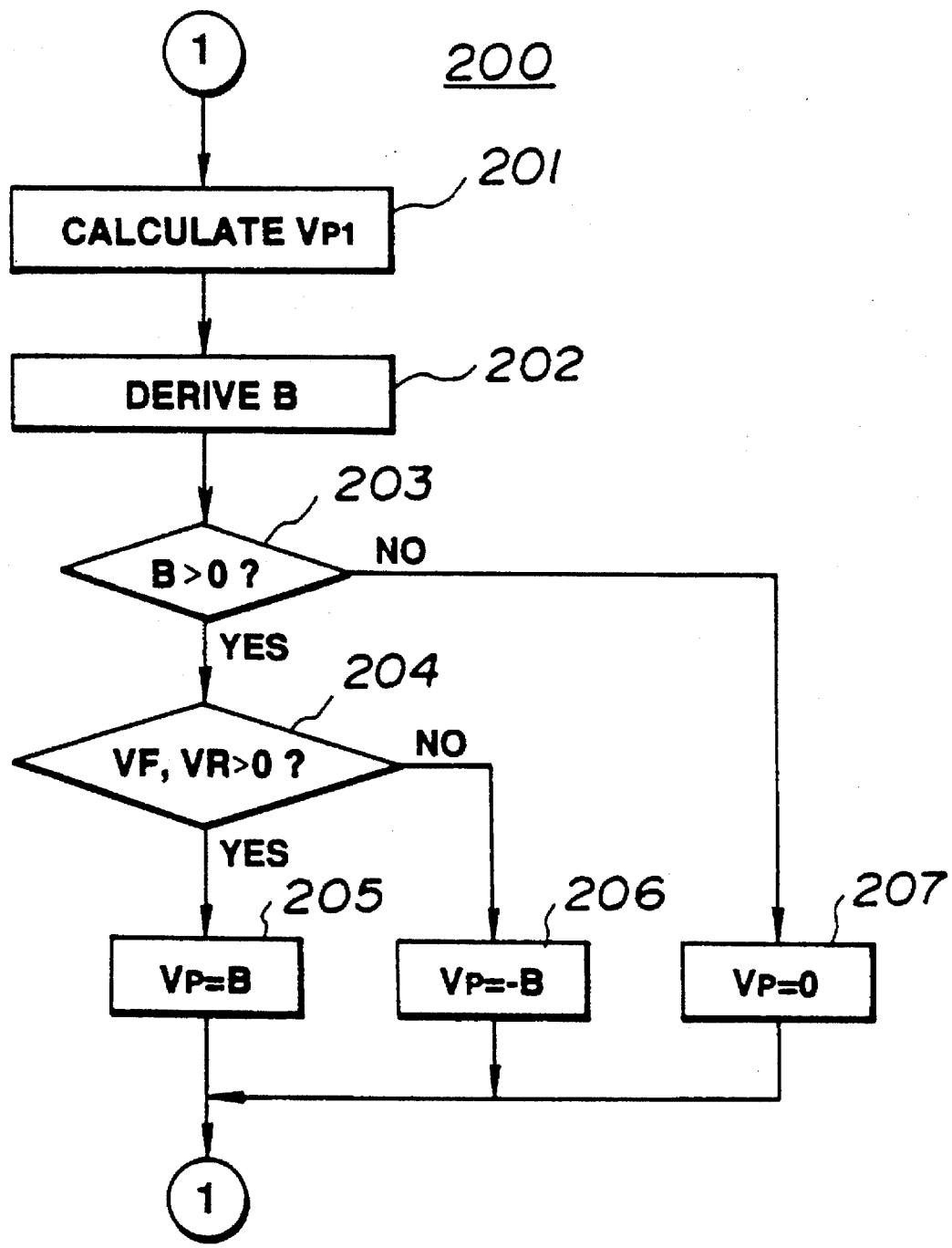
FIG. 22 is an operational flowchart executed in the control unit shown in FIG. 18 in a case of a fourth preferred embodiment of the damping force characteristic controlling system as a subroutine of a step 200.

At a step 201 shown in FIG. 22, the pitch component $v_{PI}$ is determined using the following equations;

Front tire wheel: right/left $_{FR}v_{PI}, _{FL}v_{PI} = v_{F(n)} - v_{R(n)}$.

Rear tire wheel: right/left $_{RR}v_{PI}, _{RL}v_{PI} = v_{R(n)} - v_{F(n)}$.

At the step 202, the CPU 4b determines vehicular pitch determination signals at the respective vehicular tire wheel positions B ($B_1$, $B_2$, $B_3$, $B_4$, and it is noted that each subscript numeral denotes the position of the shock absorbers $SA_1$, $SA_2$, $SA_3$, and $SA_4$).

That is to say, at the step 202, the CPU 4b determines whether phases of the respective sprung mass vertical velocities $v_F$ and $v_R$ and respective pitch component $v_{PI}$ are in the same phases (refer to regions denotes by hatched lines and net lines of FIG. 23 (C) and FIG. 23 (D)) or opposite phases and determines values of the pitch components.

Front tire wheel: left $B_1 = v_{F(n)} \times _{FL}v_{PI}$,
Front tire wheel: right $B_2 = v_{F(n)} \times _{FR}v_{PI}$.
Rear tire wheel: left $B_3 = v_{R(n)} \times _{RL}v_{PI}$,
Rear tire wheel: right $B_4 = v_{R(n)} \times _{RL}v_{PI}$, Next, at a step 203, the CPU 4b determines whether each pitch determination signal B indicates the positive value ( the phases of the sprung mass vertical velocity $v_F$ and $v_R$ are the same as those of the respective pitch components $v_{PI}$).

If Yes at the step 203 (same phase), the routine goes to a step 204. If No (opposite phase), the routine goes to a step 207.

At the step 204, the CPU 4b determines whether the respective sprung mass vertical velocities $v_F$ and $v_R$ indicate positive values (upward). If Yes (upward) at the step 204, the routine goes to a step 205. If No (downward) at the step 204, the routine goes to a step 206.

At the step 205, the CPU 4b sets the pitch components $v_P$ ($FLv_P$, $FRv_P$, $RLv_P$, and $RRv_P$) at the respective tire wheel positions to B ($B_1$, $B_2$, $B_3$, and $S_4$).

At the step 206, the CPU 4b sets the pitch components $v_P$ ($FLv_P$, $FRv_P$, $RLv_P$, $RRv_P$) to −B ($−B_1$, $−B_2$, $−B_3$, and $−B_4$).

At the step 207, the respective pitch components $v_P$ at the respective tire wheel positions are set to 0s.

That is to say, only when the phases of the sprung mass vertical velocities $v_F$ and $v_R$ and of respective pitch signals $v_{PI}$ are the same, the pitch components $v_P$ (B or −B) are added to the control signals V so that a more effective suppression control can be carried out.

(Fifth Embodiment)

A difference point of the fifth embodiment from the second, third, and fourth preferred embodiments is that the determination of roll components $v_R$.

Figure 24:
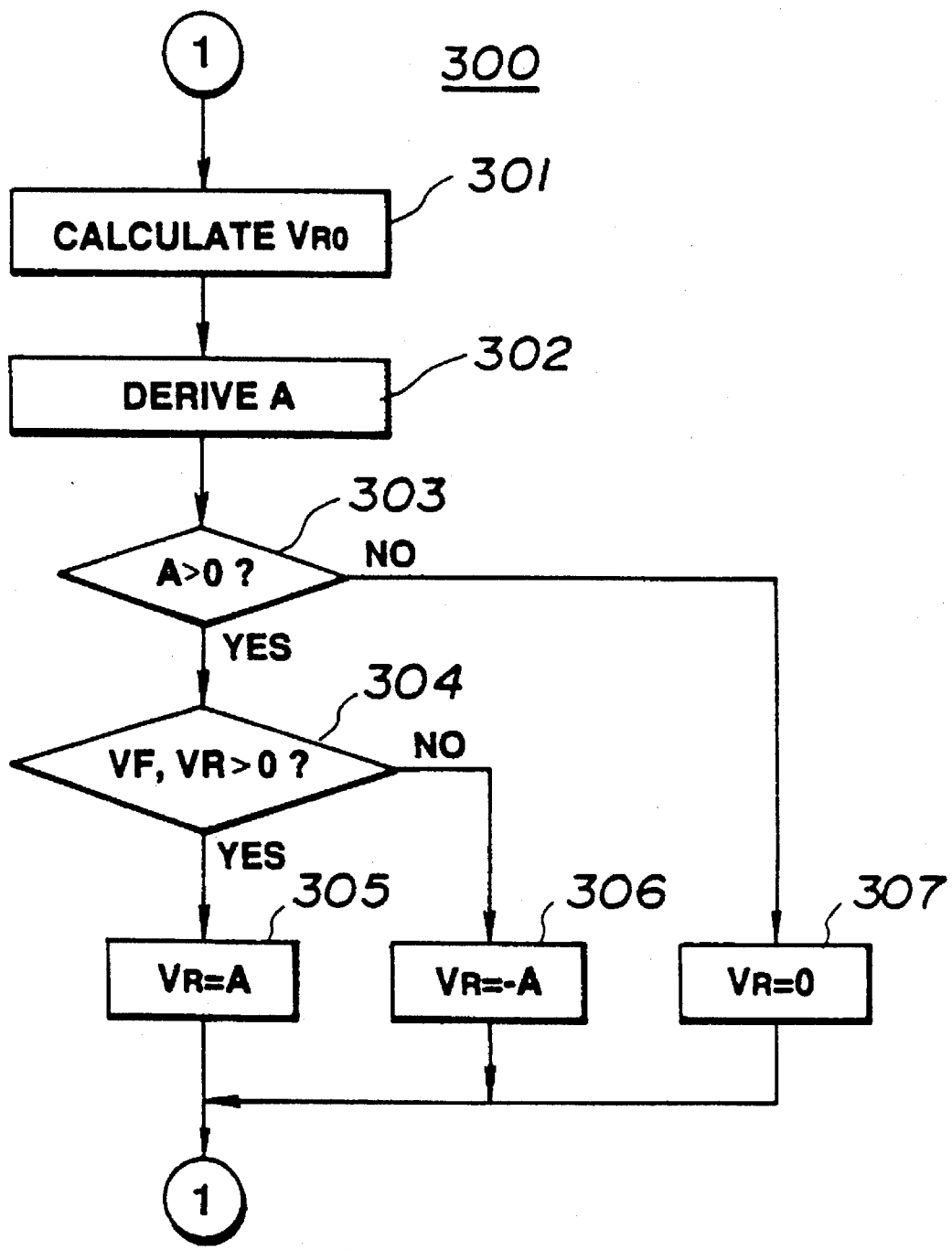
FIG. 24 is an operational flowchart executed in the control unit shown in FIG. 18 in a case of a fifth preferred embodiment of the damping force characteristic controlling system as a subroutine of a step 300.

That is to say, in place of the step 108 of FIG. 19, a subroutine of a step 300 is executed as shown in FIG. 24.

At a step 300, the CPU 4b determines the roll signal $v_{RO}$ using the following numerical equations.

It is noted that FIGS. 25(A) through 25(D) show integrally a timing chart of each signal of the left tire wheel side relative velocity $v_{FST1(n)}$, right tire wheel side relative velocity $v_{FST2(n)}$, left tire wheel side roll signals $_{FR}v_{RO}$, $_{FL}v_{RO}$, and right tire wheel side roll signals $_{FR}v_{RO}$ and $_{RR}v_{RO}$.

Front tire wheel: right/left; $_{FR}v_{RO}, _{FL}v_{RO} = v_{FST1(n)} - v_{FST2(n)}$, Rear tire wheel: right/left; $_{FR}v_{RO}, _{RR}v_{RO} = v_{FST2(n)} - v_{FST1(n)}$.

At a step 302, the CPU 4b determines vehicular roll determination signals A at the respective wheel positions; A ($A_1$, $A_2$, $A_3$, and $A_4$, each numerical subscript denotes the corresponding number of shock absorbers $SA_1$, $SA_2$, $SA_3$, and $SA_4$) using the following equations.

That is to say, at the step 302, the CPU 4b determines whether the phases of respective sprung mass vertical velocities $v_F$ and $v_R$ and respective roll signals $v_{RO}$ indicate the same phases (regions denoted by hatched line or net lines of FIGS. 25 (C) and 25 (D) and determines values of the roll components.

Front tire wheel left $A_1 = v_{F(n)} \times _{FL}v_{RO}$,

Front tire wheel right $A_2 = v_{F(n)} \times _{FR}v_{RO}$,

Rear tire wheel left $A_3 = v_{R(n)} \times _{RL}v_{RO}$,

Rear tire wheel right $A_4 = v_{R(n)} \times RRv_{RO}$.

At a step 303A, the CPU 4b determines whether each roll determination signal B indicates the positive value (the phases of the sprung mass vertical velocities $v_F$ and $v_R$ and respective roll signals $v_{RO}$ are the same). If Yes (the same phase) at the step 303, the routine goes to a step 304. If No (opposite phase) at the step 303, the routine goes to a step 307.

At the step 304, the CPU 4b determines whether the respective sprung mass vertical velocities $v_F$ and $v_R$ indicate positive values (upward).

It Yes at the step 304, the routine goes to a step 305. If No (downward) at the step 304, the routine goes to a step 306.

At the step 305, the CPU 4b sets the roll components $v_R$ at the respective tire wheels to A ($A_1$, $A_2$, $A_3$, $A_4$, and it is noted that each numerical subscript denotes the corresponding shock absorbers SA ($SA_1$, $SA_2$, $SA_3$, and $SA_4$)).

At the step 306, the roll components $v_R$ at the respective tire wheel positions are set to −A ($−A_1$, $−A_2$, $−A_3$, and $−A_4$).

At the step 307, the roll components $v_R(_{FL}v_R, _{FR}v_R, _{RL}v_R$, and $_{RR}v_R$) for the respective tire wheel positions are set to 0s.

In the fifth embodiment, only when the phases of the respective sprung mass vertical velocities $v_F$ and $v_R$ and respective roll signals $v_{RO}$ are the same phases, the roll components $v_R$ (A or −A) are added to the control signals V so that a more effective roll suppression control can be achieved.

(Sixth embodiment)

Figure 26:
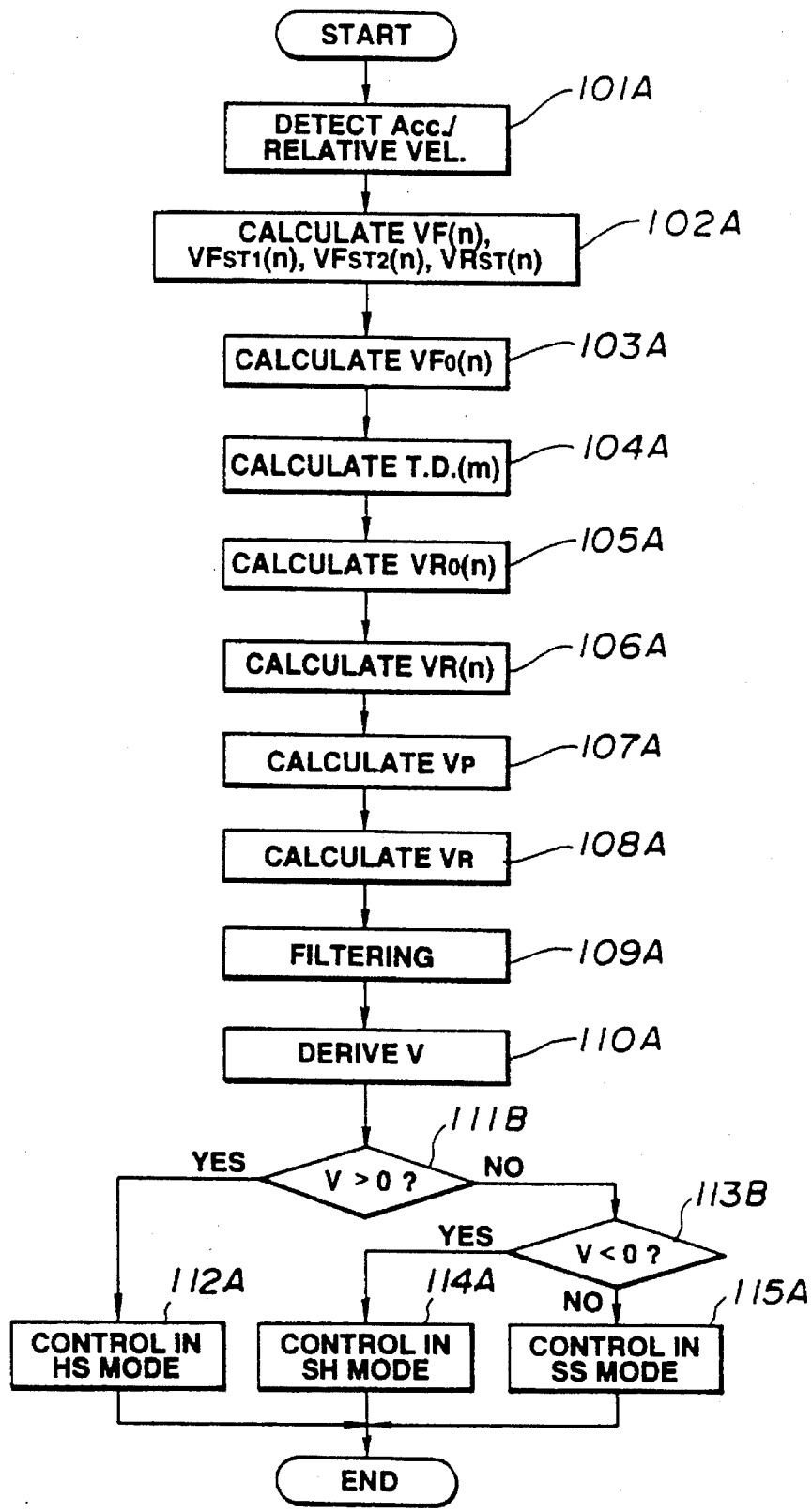
FIG. 26 is an operational flowchart executed in the control unit in a case of a sixth preferred embodiment according to the present invention.

FIG. 26 shows a control routine executed by the control unit 4 in the case of a sixth preferred embodiment. The structure of sixth embodiment is the substantially the same as that in the case of the first embodiment shown in FIGS. 1 and 2.

Figure 27:
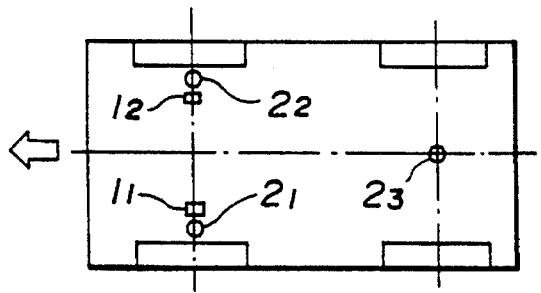
FIG. 27 is a positional view of each of vertical G sensors and vehicular height sensors used in the case of the sixth preferred embodiment shown in FIG. 26.

The structure of each shock absorber SA is the same as that in the case of the first embodiment shown in FIGS. 3 through 12. The structure of the interface circuit 4a is the same as in the first embodiment shown in FIG. 13. The arrangement of each sprung mass G sensor 1 ($1_1$ and $1_2$) and three vehicular height sensors $2_1$ through $2_3$ shown in FIG. 27 are the same as those in the first embodiment shown in FIG. 16.

Although the steps 101A through 110A are approximately the same as those in the case of the second embodiment shown in FIG. 19, the functions executed in the respective steps will be described below with reference to FIG. 26.

At the step 101A, the CPU 4b reads the sprung mass vertical acceleration from the output signals of the front tire wheel left and right vertical G sensors $1_1$ and $1_2$ and determines the relative displacements between the sprung mass and unsprung mass from the output signals of the three vehicular height sensors $2_1$, $2_2$, and $2_3$.

At the step 102A, the CPU 4b determines the sprung mass vertical velocities $v_{F1(n)}$ and $v_{F2(n)}$ as the bounce components by integrating the vertical sprung mass accelerations and determines relative velocities $v_{FST1(n)}$, $v_{FST2(n)}$, and $v_{RST(n)}$ from the determined relative displacements.

At the step 103A, the CPU $4b$ determines the front tire wheel side road surface input velocity $v_{F0(n)}$ using an equation described below:

$$v_{F0(n)} = (v_{F1(n)} + v_{F2(n)})/2 - (v_{FST1(n)} + v_{FST2(n)})/2.$$

At the step 104A, the CPU $4b$ determines which number of routines (m) corresponds to the passed time difference between the front tire wheels and rear tire wheel at the same road surface. m=(wheel base)/(vehicle speed)×1/Δt.

At the step 105A, the CPU $4b$ calculates the rear tire wheel road surface input velocity $v_{R0(n)}$ as follows:

$$v_{R0(n)} = v_{F0(n-m)}$$

At the step 106A, the CPU $4b$ determines the rear tire wheel side sprung mass vertical velocity $v_{R(n)}$ as the bounce component.

$$v_{R(n)} = v_{R0(n)} + v_{RST(n)}.$$

At the step 107A, the pitch components $v_P$ for the respective shock absorbers SA are determined as follows:

$$_{FL}v_P, {}_{FR}v_P = (v_{F1(n)} + v_{F2(n)})/2 - v_{R(n)},$$

$$_{RL}v_P, {}_{RR}v_P = v_{R(n)} - (v_{F1(n)} + v_{F2(n)})/2.$$

At the step 108A, the vehicular roll components $v_R$ are determined using the following equations:

$$_{FL}v_R, {}_{RL}v_R = v_{F1(n)} - v_{F2(n)},$$

$$_{FR}v_R, {}_{RR}v_R = v_{F2(n)} - v_{F1(n)}.$$

At the step 109A, the CPU $4b$ commands to the interface circuit to eliminate unnecessary components of the signals derived from the respective sensors using the series off filters shown in FIG. 13.

At the step 110A, the CPU $4b$ determines the control signals V for the respective shock absorbers SA using the following equations:

$$FLV = \alpha_1 \cdot (v_{F1(n)} + v_{F2(n)})/2 + \beta_1 \cdot {}_{FL}v_P + \tau_1 \cdot {}_{FL}v_R,$$

$$FRV = \alpha_1 \cdot (v_{F1(n)} + v_{F2(n)})/2 + \beta_1 \cdot {}_{FR}v_P + \tau_1 \cdot {}_{FR}v_R,$$

$$RLV = \alpha_2 \cdot v_{R(n)} + \beta_2 \cdot {}_{RL}v_P + \tau_2 \cdot {}_{RL}v_R,$$

$$RRV = \alpha_2 \cdot v_{R(n)} + \beta_2 \cdot {}_{RR}v_P + \tau_2 \cdot {}_{RR}v_R,$$

In the above equations, FLV is the control signal for the front left road wheel side shock absorber, FRV is the control signal for the front right road wheel side shock absorber, RLV is the control signal for the rear left road wheel side shock absorber, and RRV is the control signal for the rear right road wheel side shock absorber.

It is noted that $\alpha_1$, $\beta_1$, and $\tau_1$ denote respective proportional constants for the front tire wheel sides and $\alpha_2$, $\beta_2$, and $\tau_2$ denote respective proportional constants for the rear tire wheel sides.

At a step 111B, the CPU $4b$ determines whether the control signal V indicates a positive value exceeding zero. If Yes at the step 111B, the routine goes to a step 112A. If No at the step 111B, the routine goes to a step 113B.

At the step 112A, the CPU $4b$ issues the control signal V so that each shock absorber SA ($SA_1$ and $SA_2$ or $SA_3$ and $SA_4$) is controlled to provide the extension stroke side hard region HS.

At the step 113B, the CPU $4b$ determines whether the control signal V indicates the negative value below zero.

If Yes at the step 113B, the routine goes to the step 114A. If No at the step 113B, the routine goes to the step 115A.

At the step 114A, the CPU $4b$ sets the respective shock absorbers SA to the compression stroke side hard regions SH.

At the step 115A, the CPU $4b$ sets the respective shock absorbers $SA_1$ and $SA_2$ ($SA_3$, $SA_4$) to the soft regions SS.

If the control signal V based on the sprung mass vertical velocities $v_{F1(n)}$, $v_{F2(n)}$ (and $v_{R(n)}$) are varied as if the control signal were varied sinusoidal waves. When the control signal V indicates instantaneously zero, the shock absorbers SA are controlled to be set at the soft regions SS.

If the control signal V goes positive, the shock absorbers SA are set in the extension stroke side hard regions HS and, on the other hand, fixed at the low damping force characteristic at the compression stroke side. The damping force characteristic at the extension stroke side is varied in proportion to the magnitude of the control signal V. At this time, the damping force characteristic C is controlled as C=k·V.

On the other hand, if the control signal goes negative, the shock absorbers SA are controlled to provide the compression stroke side hard region SH and to provide the extension stroke side for the fixed low damping force characteristic. The damping force characteristic at the compression stroke side is varied in proportion to the control signal V (C=k·V).

The effects of the sixth embodiment are approximately the same as those achieved by the first embodiment.

As the modification of the sixth embodiment is the same as that for the first embodiment.

(Seventh embodiment)

In a seventh embodiment, a difference point of the seventh embodiment from the sixth embodiment is that, in place of the step 107A of FIG. 26, the subroutine shown in FIG. 22 in the case of the fourth embodiment is applied to the seventh embodiment in order to determine the pitch components $v_P$.

That is to say, at the step 201, the following equations are established:

Front tire wheel left side: $_{FL}v_{Pf} = v_{F1(n)} - v_{R(n)}$.

Front tire wheel right side: $_{FR}v_{Pf} = v_{F2(n)} - v_{R(n)}$.

Rear tire wheel left side: $_{RL}v_{Pf} = v_{R(n)} - v_{F1(n)}$.

Rear tire wheel right side: $_{RR}v_{Pf} = v_{R(n)} - v_{F2(n)}$.

The pitch determination signals B are as follows:

Front tire wheel left side: $B_1 = v_{F1(n)} \times {}_{FL}v_{Pf}$.

Front tire wheel right side: $B_2 = v_{F2(n)} \times {}_{FR}v_{Pf}$.

Rear tire wheel left side: $B_3 = v_{R(n)} \times {}_{RL}v_{Pf}$.

Rear tire wheel right side: $B_4 = v_{R(n)} \times {}_{RR}v_{Pf}$

The other steps in the case of the seventh embodiment are the same as those in the case of the fourth embodiment.

(Eighth Embodiment)

A difference point of an eighth preferred embodiment from the sixth embodiment is that, in place of the step 108A of FIG. 26, the subroutine of the step 300 is executed in the eighth embodiment to determine the roll components $v_R$.

FIGS. 28(A) through 28(D) show integrally a timing chart indicating variations in the sprung mass vertical velocities $v_{F1(n)}$ at the left side tire wheel positions, the sprung mass vertical velocities $v_{F2(n)}$ at the right side tire wheel positions, left tire wheel side roll signals $_{FL}v_{R0}$ and $_{RL}v_{R0}$, and right tire wheel side roll signals $_{FR}v_{R0}$ and $_{RR}v_{R0}$, Front left tire wheel and rear left tire wheel: $_{FL}v_{R0}$ and $_{RL}v_{R0}=v_{F1(n)}-v_{F2(n)}$.

Front right tire wheel and rear right tire wheel: $_{FR}v_{R0}$ and $_{RR}v_{R0}=v_{F2(n)}-v_{F1(n)}$.

In addition, Front left tire wheel side: $A_1 = v_{F1(n)} \times {}_{FL}v_{R0}$.
Front right tire wheel side: $A_2 = v_{F2(n)} \times {}_{FR}v_{R0}$.
Rear right tire wheel side: $A_3 = v_{R(n)} \times {}_{RL}v_{R0}$.
Rear left tire wheel side: $A_4 = v_{R(n)} \times {}_{RR}v_{R0}$.

The contents of the other steps are the same as those in the case of the fifth embodiment.

As described hereinabove, in the damping force characteristic controlling system for the respective shock absorbers according to the present invention, the control signals for the respective shock absorbers are used to control damping force characteristics at the rear tire wheel sides on the basis of the front tire wheel side road surface input vertical velocities determined from the front tire wheel side sprung mass vertical velocities and relative velocities thereof and the rear tire wheel side sprung mass vertical velocities at the rear tire wheel sides, the system manufacturing cost can be reduced by the reduction of the vertical G sensors at the rear tire wheel sides. In addition, the switching timing can precede the other control of the rear tire wheel sides on the basis of the front tire wheel side detection results. The controllability for the rear tire wheel side shock absorbers can be improved.

Furthermore, the high responsive characteristics of the control of the damping force characteristic can be achieved by the use of the shock absorbers SA used in every embodiment. The durability and power consumption for the pulse motors can be improved.

The foregoing description has been made in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for controlling damping forces for respective shock absorbers of a vehicle, comprising:

a) a plurality of shock absorbers, each shock absorber being interposed between a sprung mass and unsprung mass of the vehicle and located adjacent to a corresponding one of a front left tire wheel, front right tire wheel, rear left tire wheel, and rear right tire wheel of the vehicle, b) damping force characteristic changing means for changing a damping force characteristic of each shock absorber at either or both of stroke directions with respect to a piston of each shock absorber in response to an input control signal;

c) front tire wheel side sprung mass vertical velocity determining means for determining a front tire wheel side sprung mass vertical velocity;

d) front tire wheel side relative velocity determining means for determining a relative velocity between the sprung mass and unsprung mass of the vehicle at the front tire wheels side;

e) means for deriving a front tire wheel side road surface input velocity from the front tire wheel side sprung mass vertical velocity and from the front tire wheel side relative velocity between the sprung mass and unsprung mass;

f) rear tire wheel side sprung mass relative velocity determining means for determining a relative velocity between the sprung mass and unsprung mass at the rear tire wheels side;

g) means for determining a rear tire wheel side sprung mass vertical velocity based on the rear tire wheel side relative velocity between the sprung mass and unsprung mass; and h) damping force characteristic controlling means for controlling the damping force characteristics of the shock absorbers located at the front tire wheels side on the basis of a first control signal determined on the basis of the front tire wheel side sprung mass vertical velocity via damping force characteristic changing means and for controlling the damping force characteristics of the shock absorbers located at the rear tire wheels side on the basis of a second control signal via said damping force characteristic changing means, the second control signal at the rear tire wheels side being determined on the basis of said front tire wheel side road surface input velocity and on the basis of said rear tire wheel side sprung mass vertical velocity.

2. A system for controlling damping forces for respective shock absorbers of a vehicle as set forth in claim 1, wherein said front tire wheel side vertical velocity determining means includes a front left tire wheel vertical G sensor located adjacent to one of the shock absorbers for the front left tire wheel and a front right tire wheel vertical G sensor located adjacent to one of the shock absorbers for the front right tire wheel, said front tire wheel side relative velocity determining means includes a front left tire wheel side vehicular height sensor and a front right tire wheel side vehicular height sensor, and said rear tire wheel side relative velocity determining means includes a rear tire wheel vehicular height sensor located on a part of the vehicle body placed on a center position between a line connecting both rear left and right tire wheels.

3. A system for controlling damping forces for respective shock absorbers of a vehicle as set forth in claim 2, wherein said front tire wheel side sprung mass vertical velocity ($V_{F1(n)}$) is determined by integrating the vertical accelerations detected by means of the front left tire wheel side vertical G sensor and the front right tire wheel side vertical G sensor and said front tire wheel side relative velocity and rear tire wheel side relative velocity ($v_{F2(n)}$ and $V_{R2(n)}$) are determined from relative displacements between the sprung mass and unsprung mass at the front tire wheels side and at the rear tire wheels side detected by the respective vehicular height sensors.

4. A system for controlling damping forces for respective shock absorbers of a vehicle as set forth in claim 3, wherein said damping force characteristic controlling means includes first means for determining whether a magnitude of the sprung mass vertical velocity ($v_{F1(n)}$) is equal to or above a plus predetermined threshold value $+\delta_T$ and second means for controlling the shock absorbers located at the front left and right tire wheels to provide extension stroke side hard regions (HS) when the first means determined that $v_{F1(n)}$ is equal to or above $+\delta_T$, wherein (n) denotes a number of routines that said damping force characteristic controlling means executes a predetermined control routine.

5. A system for controlling damping forces for respective shock absorbers of a vehicle as set forth in claim 4, wherein said damping force characteristic controlling means further includes third means for determining whether $v_{F1(n)}$ is negatively below a minus predetermined threshold value $-\delta_C$ and fourth means for controlling the shock absorbers located at the front tire wheels side to provide compression stroke side hard regions (SH) when said third means determines that $v_{F1(n)}$ is negatively below $-\delta_C$.

6. A system for controlling damping forces for respective shock absorbers of a vehicle as set forth in claim 5, wherein said damping force characteristic controlling means further includes fifth means for determining whether $v_{F1(n)}$ falls in a range from $+\delta_T$ to $-\delta_C$ and sixth means for controlling the shock absorbers located at the front tire wheels to provide both soft regions (SS) when said fifth means determines that $v_{F1(n)}$ is within the range.

7. A system for controlling damping forces for respective shock absorbers of a vehicle as set forth in claim 6, wherein said front tire wheel side road surface input velocity is determined as $v_{F0(n)} = v_{F1(n)} - v_{F2(n)}$.

8. A system for controlling damping forces for respective shock absorbers of a vehicle as set forth in claim 7, wherein said damping force characteristic controlling means includes seventh means for determining the road surface input velocity ($v_{R0(n)}$) at the rear tire wheels side using the front tire wheel road surface input velocity ($v_{F0(n)}$) which is m-th number of controlling routines prior to the front tire wheel side road surface input velocity as $v_{F0(n-m)}$ and determining as follows: $v_{R0(n)} = v_{F0(n)}$, and eighth means for determining the rear tire wheel side sprung mass vertical velocity $v_{R1(n)}$ as follows: $v_{R1(n)} = v_{R0(n)} + v_{R2(n)}$, wherein $v_{R2(n)}$ denotes the relative velocity at the rear tire wheels side derived from the relative displacement detected by means of the rear tire wheel side vehicular height sensor.

9. A system for controlling damping forces for respective shock absorbers of a vehicle as set forth in claim 8, wherein m-th number of time the damping force characteristic controlling means executes the control routine corresponds to a time difference from a time at which the front tire wheels have passed on the road surface and at a time at which the rear tire wheels have passed on the same road surface.

10. A system for controlling damping forces for respective shock absorbers of a vehicle as set forth in claim 9, wherein said damping force characteristic controlling means includes ninth means for determining whether the sprung mass vertical velocity ($v_{R1(n)}$) is equal to or above the plus predetermined threshold value $+\delta_T$ and tenth means for controlling the shock absorbers located at the rear tire wheels side to provide the extension stroke side hard regions (HS) when said ninth means determines that $v_{R1(n)}$ is equal to or higher than $+\delta_T$.

11. A system for controlling damping forces for respective shock absorbers of a vehicle as set forth in claim 10, wherein said damping force characteristic controlling means includes eleventh means for determining whether $v_{R1(n)}$ is negatively below the minus predetermined threshold value $-\delta_C$ and twelfth means for controlling the shock absorbers located at the rear tire wheels side to provide the compression stroke side hard regions (SH) when said eleventh means determines that $v_{R1(n)}$ is negatively below the minus predetermined threshold value $-\delta_C$.

12. A system for controlling damping forces for respective shock absorbers of a vehicle as set forth in claim 11, wherein said damping force characteristic controlling means controls said shock absorbers located at the rear tire wheels side to provide the soft regions (SS) at both extension and compression stroke sides when $v_{R1(n)}$ falls in the range from $+\delta_T$ to $-\delta_C$.

13. A system for controlling damping forces for respective shock absorbers of a vehicle as set forth in claim 12, wherein the stroke regions at which the damping force is varied have damping force characteristics for the front and rear shock absorbers determined according to the equations $c = k \cdot v_{F1(n)}$ and $c = k \cdot v_{R1(n)}$, respectively, wherein k denotes a proportional constant.

14. A system for controlling damping forces for respective shock absorbers of a vehicle as set forth in claim 13, which further comprises a vehicle speed sensor which is so constructed and arranged on the vehicle as to produce a signal indicative of the vehicle speed, and wherein m=(wheel base)/(vehicle speed derived from said vehicle speed sensor)×1/$\Delta t$, wherein m denotes the number of control routines executed by the controlling means between a time at which the front tires pass a reference point add a time at which the rear tires pass the same reference point and $\Delta t$ denotes a time duration during which a single control routine is executed.

15. A system for controlling damping forces for respective shock absorbers of a vehicle as set forth in claim 14, wherein when said seventh means determines the road surface input velocity $v_{R0(n)}$ at the rear tire wheels side using the road surface input velocity $v_{F0(n)}$ at the front tire wheels side and using the relative velocity $v_{R2(n)}$ between the sprung mass and unsprung mass at the rear tire wheels side, said $v_{F0(n)}$ being used as a slight prior data of $v_{F0(n)}$ earlier than the time at which the time difference determined according to the wheel base and vehicle speed.

16. A system for controlling damping forces for respective shock absorbers of a vehicle as set forth in claim 3, wherein said damping force characteristic controlling means determines a vehicular pitch component $v_P$ for each shock absorber SA as follows:

$$FLv_P, FRv_P = (v_{F1(n)} + v_{F2(n)})/2 - v_{R(n)}, \text{ and}$$

$$RLv_P, RRv_P = v_{R(n)} - (v_{F1(n)} + v_{F2(n)})/2,$$

wherein said damping force characteristic controlling means determines a vehicular roll component $v_R$ for each shock absorber SA as follows:

$$FLv_R, RLv_R = v_{F1(n)} - v_{F2(n)}, \text{ and}$$

$$FLv_R, RLv_R = v_{F2(n)} - v_{F1(n)},$$

and wherein said damping force characteristic controlling means determines the control signal V for each shock absorber as follows:

$$FLV = \alpha_1 \cdot (v_{F1(n)} + v_{F2(n)})/2 + \beta_1 \cdot FLv_P + \tau_1 \cdot FLv_R,$$

$$FRV = \alpha_1 \cdot (v_{F1(n)} + v_{F2(n)})/2 + \beta_1 \cdot FLv_P + \tau_1 \cdot FLv_R,$$

$$RLV = \alpha_2 \cdot v_{R(n)} + \beta_2 \cdot RLv_P + \tau_2 \cdot RLv_R, \text{ and}$$

$$RRV = \alpha_1 \cdot v_{R(n)} + \beta_2 \cdot RRv_P + \tau_2 \cdot RRv_R,$$

wherein FLV is the control signal for the front left road wheel side shock absorber, FRV is the control signal for the front right road wheel side shock absorber, RLV is the control signal for the rear left road wheel side shock absorber, RRV is the control signal for the rear right road wheel side shock absorber, $\alpha_1$, $\beta_1$, and $\tau_1$ denote respective proportional constants for the front tire wheel sides, and $\alpha_2$, $\beta_2$, and $\tau_2$ denote respective proportional constants for the rear tire wheel sides.

17. A system for controlling damping forces for respective shock absorbers of a vehicle as set forth in claim 1, wherein said front tire wheel side sprung mass vertical velocity determining means includes a vertical G sensor located at a center position of a line connecting both front tire wheels and said front tire wheel sprung mass vertical velocity determining means determines the sprung mass vertical velocity $v_{F(n)}$ by integrating an output signal of the vertical G sensor, wherein said front tire wheel side relative velocity determining means includes a front left tire wheel side vehicular height sensor which is so constructed as to produce a signal indicative of a relative displacement between the sprung mass and unsprung mass at the front left tire wheel side and a front right tire wheel side vehicular height sensor which is so constructed as to produce a signal indicative of a relative displacement between the sprung mass and unsprung mass at the front right tire wheel side, said front tire wheel side relative velocity determining means determining the relative velocities ($v_{FST1(n)}$) and ($v_{FST2(n)}$) at the front left and right tire wheels side according to the detected signals of the front left and right tire wheel side vehicular height sensors, and wherein said rear tire wheel side sprung mass relative velocity determining means includes a rear tire wheel side vehicular height sensor located on a center position of a line connecting both rear tire wheels, said rear tire wheel side relative velocity determining means determining the rear tire wheel side relative velocity ($v_{RST(n)}$) according to the detected relative displacement of the rear tire wheel side vehicular height sensor.

18. A system for controlling damping forces for respective shock absorbers of a vehicle as set forth in claim 17, wherein said damping force characteristic controlling means determines the front tire wheel side road surface input velocity $v_{F0(n)}$ as follows:

$$V_{F0(n)} = v_{F(n)} - (v_{FST1(n)} - v_{FST2(n)})/2,$$

wherein (n) denotes a number of times said damping force characteristic controlling means executes the control routine.

19. A system for controlling damping forces for respective shock absorbers of a vehicle as set forth in claim 18, wherein said damping force characteristic controlling means includes rear tire wheel sprung mass vertical velocity determining means for determining the rear tire wheel side sprung mass vertical velocity ($v_{R(n)}$) according to the following equation:

$$v_{R(n)} = v_{R0(n)} + v_{RST(n)},$$

wherein $v_{R0(n)}$ denotes a rear tire wheel side road surface input velocity determined as follows; $v_{R0(n)} = v_{F0(n-m)}$, wherein m denotes a number of routines said damping force characteristic controlling means executes the control routine which corresponds to a time difference between a time at which the front tire wheels have passed on a road surface and a time at which the rear tire wheels have passed the same road surface.

20. A system for controlling damping forces for respective shock absorbers of a vehicle as set forth in claim 19, wherein said damping force characteristic controlling means determines a vehicular pitch component $v_P$ at each shock absorber position as follows:

$$_{FL}v_P, {}_{FR}v_P = v_{F(n)} - v_{R(n)}, \text{ and}$$

$$_{RL}v_P, {}_{RR}v_P = v_{R(n)} - v_{F(n)},$$

wherein $_{FL}$ denotes the front left tire wheel side, $_{FR}$ denotes the front right tire wheel side, $_{RL}$ denotes the rear left tire wheel side, and $_{RR}$ denotes the rear right tire wheel side, and wherein said damping force characteristic controlling means determines a vehicular roll component $v_R$ at each shock absorber position as follows:

$$_{FL}v_R, {}_{RL}v_R = v_{FST1(n)} - v_{FST2(n)}, \text{ and}$$

$$_{FR}v_R, {}_{RR}v_R = v_{FST2(n)} - v_{FST2(n)}.$$

21. A system for controlling damping forces for respective shock absorbers of a vehicle as set forth in claim 20, wherein said damping force characteristic controlling means determines the control signal for each shock absorber as follows:

$$FLV = \alpha_1 \cdot (v_{F1(n)} + V_{F2(n)})/2 + \beta_1 \cdot FLv_P + \tau_1 \cdot FLv_R,$$

$$FRV = \alpha_1 \cdot (v_{F1(n)} + V_{F2(n)})/2 + \beta_1 \cdot FLv_P + \tau_1 \cdot FLv_R,$$

$$RLV = \alpha_2 \cdot v_{R(n)} + \beta_2 \cdot RLv_P + \tau_2 \cdot RLv_R, \text{ and}$$

$$RRV = \alpha_2 \cdot v_{R(n)} + \beta_2 \cdot RLv_P + \tau_2 \cdot RLv_R,$$

wherein FLV is the control signal for the front left road wheel side shock absorber, FRV is the control signal for the front right road wheel side shock absorber, RLV is the control signal for the rear left road wheel side shock absorber, RRV is the control signal for the rear right road wheel side shock absorber, $\alpha_1$, $\beta_1$, and $\tau_1$ denote respective proportional constants for the front tire wheel sides, and $\alpha_2$, $\beta_2$, and $\tau_2$ denote respective proportional constants for the rear tire wheel sides, and wherein $V_{F(n)}$ and $v_{R(n)}$ denote bounce rates for the front tire wheels and rear tire wheels.

22. A system for controlling damping forces for respective shock absorbers of a vehicle as set forth in claim 21, wherein said damping force characteristic controlling means determines whether any one or more control signals exceed a plus predetermined threshold value $+\delta_T$, fall in a range from the plus predetermined threshold value to a minus predetermined threshold value $-\delta_C$, or are negatively below the minus predetermined value, the corresponding shock absorbers are controlled to provide either one of extension stroke side hard region (HS), soft regions (SS), or compression stroke side hard regions (SH) according to the determination made by the controlling means.

23. A system for controlling damping forces for respective shock absorbers of a vehicle as set forth in claim 19, wherein said damping force characteristic controlling means includes:

a) first means for determining each pitch signal $v_{PI}$ for each shock absorber as follows:

$$_{FR}v_{PI}, {}_{FL}v_{PI} = v_{F(n)} - v_{R(n)}, \text{ and}$$

$$_{RR}v_{PI}, {}_{RL}v_{PI} = v_{R(n)} - v_{F(n)},$$

b) second means for determining each pitch determination signal B for each shock absorber SA as follows:

Front left tire wheel; $B_1 = v_{F(n)} \times {}_{FL}v_{PI},$

Front right tire wheel; $B_2 = v_{F(n)} \times {}_{FR}v_{PI},$

Rear left tire wheel; $B_3 = v_{R(n)} \times {}_{RL}v_{PI},$ and

Rear right tire wheel; $B_4 = v_{R(n)} \times {}_{RR}v_{PI},$ c) third means for first determining whether each pitch determination signal B indicates positive value and second determining whether each sprung mass vertical velocity ($v_{F(n)}$, $v_{R(n)}$) indicates a positive value;

d) fourth means for setting a pitch component $v_P$ ($_{FL}v_P$, $_{FR}v_P$, $_{RL}v_P$, $_{RR}v_P$) for each tire wheel to a value of B ($B_1$, $B_2$, $B_3$, $B_4$) when the value of each B indicates a positive value and each sprung mass vertical velocity indicates a positive value;

e) fifth means for setting a pitch component $v_P$ ($_{FL}v_P$, $_{FR}v_P$, $_{RL}v_P$, $_{RR}v_P$) for each tire wheel to a value of $-B$ ($-B_1$, $-B_2$, $-B_3$, $-B_4$) when the value of each B indicates a positive value but each sprung mass vertical velocity indicates a negative value;

f) sixth means for setting a pitch component $v_P$ ($_{FL}v_P$, $_{FR}v_P$, $_{RL}v_P$, $_{RR}v_P$) for each tire wheel to zeroes when the third means determines that each B indicates a negative value; and g) seventh means for determining each control signal for each shock absorber according to the value of B set by either one of said fourth, fifth, and sixth means.

24. A system for controlling damping forces for respective shock absorbers of a vehicle as set forth in claim 19, wherein said damping force characteristic controlling means includes:

a) first means For determining each roll signal $v_{RO}$ for each shock absorber as follows:

$$_{FL}v_{RO},\ _{RL}v_{RO} = v_{FST1(n)} - v_{FST2(n)},\ \text{and}$$

$$_{FR}v_{RO},\ _{RR}v_{RO} = v_{FST2(n)} - v_{FST1(n)},$$

b) second means for determining each roll determination signal A for each shock absorber SA as follows:

*Front left tire wheel;* $A_1 = v_{F(n)} \times {}_{FL}v_{RO}$,

*Front right tire wheel;* $A_2 = v_{F(n)} \times {}_{FR}v_{RO}$,

*Rear left tire wheel;* $A_3 = v_{R(n)} \times {}_{RL}v_{RO}$, *and*

*Rear right tire wheel;* $A_4 = v_{R(n)} \times {}_{RR}v_{RO}$, c) third means for first determining whether each pitch determination signal B indicates positive value and second determining whether each sprung mass vertical velocity ($v_{F(n)}$, $v_{R(n)}$) indicates a positive value;

d) Fourth means for setting a roll component $v_R$ ($_{FL}v_R$, $_{FR}v_R$, $_{RL}v_R$, $_{RR}v_R$) for each tire wheel to a value of A ($A_1$, $A_2$, $A_3$, $A_4$) when the value of each A indicates a positive value and each sprung mass vertical velocity indicates a positive value;

e) fifth means for setting a roll component $v_R$ ($_{FL}v_R$, $_{FR}v_R$, $_{RL}v_R$, $_{RR}v_R$) for each tire wheel to a value of $-A$ ($-A_1$, $-A_2$, $-A_3$, $-A_4$) when the value of each A indicates a positive value but each sprung mass vertical velocity indicates a negative value;

f) sixth means for setting a roll component $v_R$ so ($_{FL}v_R$, $_{FR}v_R$, $_{RL}v_R$, $_{RR}v_R$) for each tire wheel to zeroes when the third means determines that each A indicates a negative value; and g) seventh means for determining each control signal for each shock absorber according to the value of A set by either one of said fourth, fifth, and sixth means.

25. A method for controlling damping forces for respective shock absorbers of a vehicle, each shock absorber being interposed between a sprung mass and unsprung mass of the vehicle and located adjacent to a corresponding one of a front left tire wheel, front right tire wheel, rear left tire wheel, and rear right tire wheel of the vehicle and damping force characteristic changing means for changing a damping force characteristic of each shock absorber at either or both of stroke directions with respect to a piston of each shock absorber in response to an input control signal, said method comprising the steps of:

a) determining a front tire wheel side sprung mass vertical velocity on the basis of a front tire wheel side sprung mass vertical acceleration;

b) determining a relative velocity between the sprung mass and unsprung mass of the vehicle at the front tire wheels side;

c) deriving a front tire wheel side road surface input velocity from the front tire wheel side sprung mass vertical velocity and from the front tire wheel side relative velocity between the sprung mass and unsprung mass;

d) determining a relative velocity between the sprung mass and unsprung mass at the rear tire wheels side;

e) determining a rear tire wheel side sprung mass vertical velocity based on the relative velocity between the sprung mass and unsprung mass at the rear tire wheels side; and f) controlling the damping force characteristics of the shock absorbers located at the front tire wheels side on the basis of the front tire wheel side sprung mass vertical velocity via said corresponding damping force characteristic changing means and controlling the damping force characteristics of the shock absorbers located at the rear tire wheels side via the corresponding damping force characteristic changing means on the basis of said front tire wheel side road surface input vertical velocity and on the basis of said rear tire wheel side sprung mass vertical velocity.

\* \* \* \* \*